US012515189B2

(12) United States Patent
Adamo et al.

(10) Patent No.: US 12,515,189 B2
(45) Date of Patent: Jan. 6, 2026

(54) FLOW REACTORS AND RELATED SYSTEMS AND METHODS

(71) Applicant: Zaiput Flow Technologies LLC, Waltham, MA (US)

(72) Inventors: Andrea Adamo, Cambridge, MA (US); Lorenzo Milani, Woburn, MA (US); Colin Patrick O'Shea, Somerville, MA (US)

(73) Assignee: Zaiput Flow Technologies LLC, Waltham, MA (US)

( * ) Notice: Subject to any disclaimer, the term of this patent is extended or adjusted under 35 U.S.C. 154(b) by 0 days.

(21) Appl. No.: 19/088,653

(22) Filed: Mar. 24, 2025

(65) Prior Publication Data
US 2025/0222427 A1   Jul. 10, 2025

Related U.S. Application Data

(63) Continuation of application No. PCT/US2023/078246, filed on Oct. 30, 2023.
(Continued)

(51) Int. Cl.
*B01J 19/24* (2006.01)
*B01J 19/00* (2006.01)
*F28D 21/00* (2006.01)

(52) U.S. Cl.
CPC ....... *B01J 19/2485* (2013.01); *B01J 19/0013* (2013.01); *F28D 21/0015* (2013.01);
(Continued)

(58) Field of Classification Search
CPC ................ B01J 19/2485; B01J 19/0013; B01J 2219/00058; B01J 2219/00076;
(Continued)

(56) References Cited

U.S. PATENT DOCUMENTS 8,524,159 B2    9/2013  Hershkowitz et al.
2013/0292320 A1*  11/2013  Verpoort .................. A61M 1/34
                                                    210/435
(Continued)

FOREIGN PATENT DOCUMENTS

WO  PCT/US2023/078246    3/2024
WO  WO 2024/097633 A1    5/2024

OTHER PUBLICATIONS

International Search Report and Written Opinion for International Application No. PCT/US2023/078246 dated Mar. 15, 2024.
(Continued)

*Primary Examiner* — Huy Tram Nguyen
(74) *Attorney, Agent, or Firm* — Wolf, Greenfield & Sacks, P.C.

(57) ABSTRACT

Fluidic systems, modules, and associated methods are generally described. In some embodiments, a fluidic system comprises a module which is configured such that fluid may flow therethrough with a relatively uniform time-averaged linear flow rate (i.e., the time-averaged flow rate that is perpendicular to the transverse cross-sectional area) and/or time-averaged flux across the transverse cross-sectional area of the module. Advantageously, such modules may behave in a way such that the time-averaged linear flow rate and/or time-averaged flux exhibits minimal or no dependence on the transverse cross-sectional area thereof. This may allow for modules to be scaled-up in a relatively facile manner by merely increasing the transverse cross-sectional area, which may eliminate or substantially reduce the need for other components of the module to be redesigned upon scale-up. In some embodiments, modules may be scaled-up in a manner that requires no or minimal chemical process adjustments.

29 Claims, 15 Drawing Sheets

Related U.S. Application Data

(60) Provisional application No. 63/421,060, filed on Oct. 31, 2022.

(52) U.S. Cl.
CPC ............. *B01J 2219/00058* (2013.01); *B01J 2219/00076* (2013.01); *B01J 2219/00162* (2013.01); *B01J 2219/2411* (2013.01)

(58) Field of Classification Search
CPC ..... B01J 2219/00162; B01J 2219/2411; F28D 21/0015
USPC ........................................................ 422/119
See application file for complete search history.

(56) References Cited

U.S. PATENT DOCUMENTS

| | | | |
|---|---|---|---|
| 2014/0323694 A1 | 10/2014 | Von Keitz et al. | |
| 2016/0362611 A1* | 12/2016 | Harris et al. | |
| 2020/0346181 A1* | 11/2020 | Willemsen | B01J 19/0053 |
| 2022/0250942 A1 | 8/2022 | Trellu et al. | |

OTHER PUBLICATIONS

[No Author Listed], GX Static Mixer Product Bulletin. Stamixco. 2007: 6 pages.

\* cited by examiner

FLOW REACTORS AND RELATED SYSTEMS AND METHODS

RELATED APPLICATIONS

This application is a continuation of International Application No. PCT/US2023/078246, filed Oct. 30, 2023, and entitled "Flow Reactors and Related Systems and Methods," which claims priority under 35 U.S.C. § 119(e) to U.S. Provisional Application No. 63/421,060, filed Oct. 31, 2022, and entitled "Flow Reactors and Related Systems and Methods," each of which is incorporated herein by reference in its entirety for all purposes.

TECHNICAL FIELD

Fluidic systems, modules, and associated methods are generally described.

SUMMARY

The present disclosure is related to fluidic system, modules, and associated methods. The subject matter of the present disclosure involves, in some cases, interrelated products, alternative solutions to a particular problem, and/or a plurality of different uses of one or more systems and/or articles.

In some embodiments, a fluidic system is provided.

In some embodiments, a fluidic system comprises a module that is configured such that a fluid flows therethrough such that, for at least 60% of the transverse cross-sections of the module through which the fluid flows, the linear flow rate of the fluid at greater than or equal to 60% of the points within the transverse cross-section, when averaged over a period of time of 60 seconds, is within 50% of the spatially-averaged linear flow rate of the fluid across the transverse cross-section when averaged over the same period of time of 60 seconds.

In some embodiments, a fluidic system comprises a module that is configured such that a fluid flows therethrough such that, for at least 60% of the transverse cross-sections of the module through which the fluid flows, the flux of the fluid at greater than or equal to 60% of the 1 mm$^2$ circles within the transverse cross-section, when averaged over a period of time of 60 seconds, is within 50% of the spatially-averaged flux of the fluid across the transverse cross-section when averaged over the same period of time of 60 seconds.

In some embodiments, a fluidic system comprises a module that is configured such that a fluid flows therethrough such that, for the transverse cross-section at the module outlet, the flux of the fluid at greater than or equal to 60% of the 1 mm$^2$ circles within the transverse cross-section, when averaged over a period of time of 60 seconds, is within 50% of the spatially-averaged flux of the fluid across the transverse cross-section when averaged over the same period of time of 60 seconds.

In some embodiments, a fluidic system comprises a first layer, a second layer disposed on the first layer, and a plurality of fluid inlets that are configured to dispense fluid to the first layer, the second layer, at least one surface of the first layer, and/or at least one surface of the second layer; wherein: the first layer comprises pores having a first average diameter, the second layer comprises pores having a second average diameter, and the second average diameter is less than the first average diameter.

In some embodiments, a fluidic system comprises a module that comprises an interconnected internal volume through which a fluid can flow. For at least 80% of the transverse cross-sections of the module, a cross-sectional area of the interconnected internal volume is greater than or equal to 30% of a cross-sectional area of the module.

In some embodiments, a method is provided.

In some embodiments, a method comprises flowing a fluid through a module in a fluidic system, wherein the fluid flows such that, for at least 60% of the transverse cross-sections of the module through which the fluid flows, the linear flow rate of the fluid at greater than or equal to 60% of the points within the transverse cross-section, when averaged over a period of time of 60 seconds, is within 50% of the spatially-averaged linear flow rate of the fluid across the transverse cross-section when averaged over the same period of time of 60 seconds.

In some embodiments, a method comprises flowing a fluid through a module in a fluidic system such that, for at least 60% of the transverse cross-sections of the module through which the fluid flows, the flux of the fluid at greater than or equal to 60% of the 1 mm$^2$ circles within the transverse cross-section, when averaged over a period of time of 60 seconds, is within 50% of the spatially-averaged flux of the fluid across the transverse cross-section when averaged over the same period of time of 60 seconds.

In some embodiments, a method comprises flowing a fluid through a module in a fluidic system such that, for the transverse cross-section at the module outlet, the flux of the fluid at greater than or equal to 60% of the 1 mm$^2$ circles within the transverse cross-section, when averaged over a period of time of 60 seconds, is within 50% of the spatially-averaged flux of the fluid across the transverse cross-section when averaged over the same period of time of 60 seconds.

In some embodiments, a method comprises flowing a fluid through a fluidic system, wherein: the fluidic system comprises a first layer, a second layer disposed on the first layer, and a plurality of fluid inlets that are configured to dispense fluid to the first layer, the second layer, at least one surface of the first layer, and/or at least one surface of the second layer; the first layer comprises pores having a first average diameter; the second layer comprises pores having a second average diameter; and the second average diameter is less than the first average diameter.

In some embodiments, a method comprises flowing a fluid through a module that comprises an interconnected internal volume through which the fluid flows, wherein, tor at least 80% of the transverse cross-sections of the module, a cross-sectional area of the interconnected internal volume is greater than or equal to 30% of a cross-sectional area of the module.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures.

DETAILED DESCRIPTION

Fluidic systems, modules, and associated methods are generally described. In some embodiments, a fluidic system comprises a module which is configured such that fluid may flow therethrough with a relatively uniform time-averaged linear flow rate (i.e., the time-averaged flow rate that is perpendicular to the transverse cross-sectional area) and/or time-averaged flux across the transverse cross-sectional area of the module. Advantageously, such modules may behave in a way such that the time-averaged linear flow rate and/or time-averaged flux exhibits minimal or no dependence on the transverse cross-sectional area thereof. This may allow for modules to be scaled-up in a relatively facile manner by merely increasing the transverse cross-sectional area, which may eliminate or substantially reduce the need for other components of the module to be redesigned upon scale-up. In some embodiments, modules may be scaled-up in a manner that requires no or minimal chemical process adjustments.

In some embodiments, a module and/or fluidic system comprises one or more structural features that facilitate flow therethrough in a desirable manner, such as with a relatively uniform time-averaged linear flow rate and/or time-averaged flux across the transverse cross-sectional area of the module (and/or one or more modules in the fluidic system). One example of a combination of structural features that may facilitate desirable fluid flow is a combination of two porous layers, such as two porous layers for which the pores have different average diameters. Fluid may flow through the porous layer comprising the pores with the larger average diameter first and then through the layer with the smaller average diameter. This flow path may beneficially homogenize the time-averaged linear flow rate across the transverse cross-section of the module.

In some embodiments, a module includes an interconnected internal volume through which fluid can flow that has a relatively large area in comparison to the total cross-sectional area of the module. Modules having this feature may desirably be capable of delivering a relatively large amount of fluid flow per the amount of materials employed to form the module. In some embodiments, a module having this feature may also allow for fluid to flow therethrough with a relatively uniform flow rate across the transverse cross-sectional area of the module and/or may be indicative of the scale-up of a module that included a smaller interconnected internal volume.

Some embodiments relate to methods in which fluid is flowed through a fluidic system comprising a module having one or more desirable properties, such as one or more of the properties described above. In some embodiments, a method comprises flowing fluid through a fluidic system and/or a module with a relatively uniform time-averaged linear flow rate and/or time-averaged flux.

Figure 1:
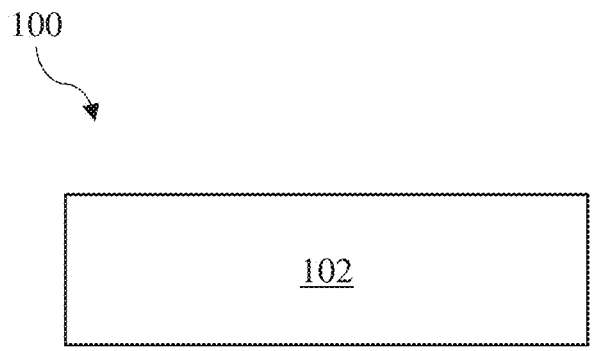
FIG. 1 shows one non-limiting embodiment of a fluidic system comprising a module, in accordance with some embodiments.
Figure 2:
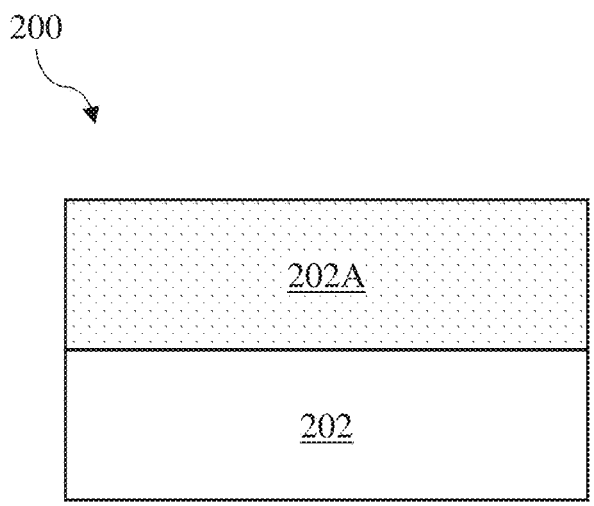
FIG. 2 shows one non-limiting example of a fluidic system that comprises a first module and a second module, in accordance with some embodiments.

Certain aspects are related to fluidic systems comprising multiple modules (e.g., having the properties described herein) arranged in series (e.g., in the form of a stack). FIG. 1 shows one non-limiting embodiment of a fluidic system 100 comprising a module 102. The module 102 shown in FIG. 1 may be configured such that fluid flows therethrough with a relatively uniform time-averaged linear flow rate and/or time-averaged flux across the transverse cross-sectional area of the module, comprise two porous layers (which may have the same average pore diameter or have different average pore diameters), and/or include a relatively large interconnected internal volume. In some embodiments, a fluidic system comprises a plurality of modules. FIG. 2 shows one non-limiting example of a fluidic system 200 that comprises a first module 202 and a second module 202A. It is also possible for a fluidic system to further modules than those shown in FIG. 2 (e.g., three or more modules, four or more modules, five or more modules, six or more modules, etc.). When a fluidic system comprises two or more modules, the fluidic system may comprise some modules that are of the same type and/or may comprise some modules that are of different types. In certain embodiments in which the fluidic system comprises two or more modules, the modules may each be connected in series.

Figure 3:
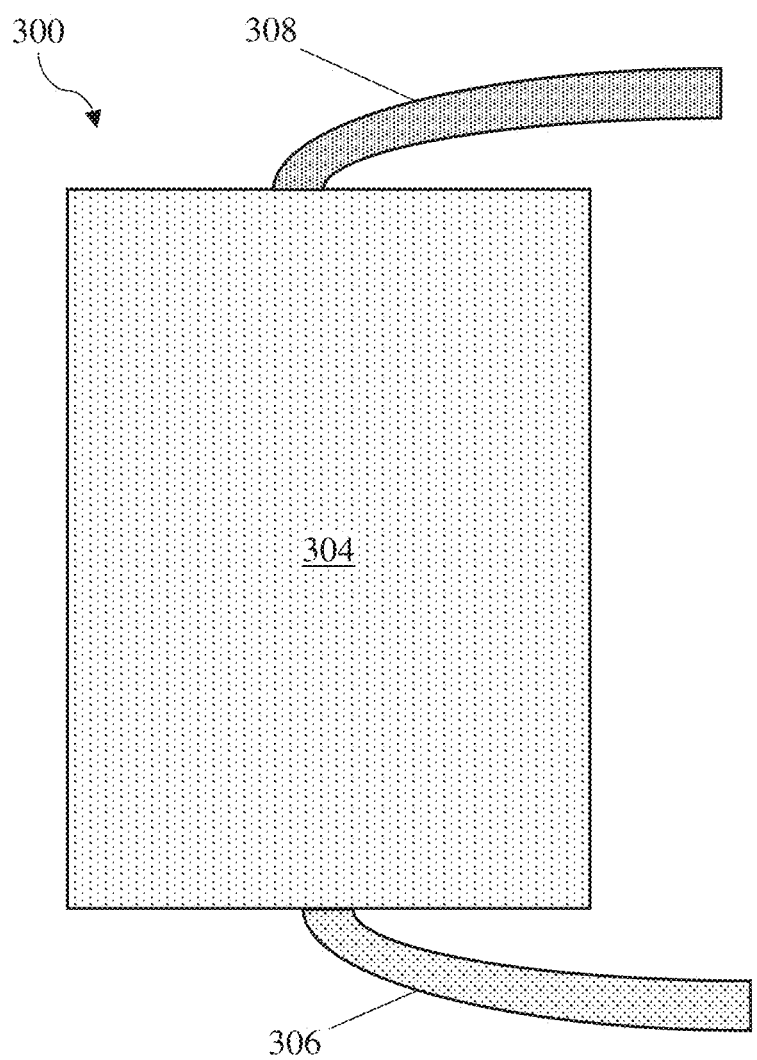
FIG. 3 shows one non-limiting example of a fluidic system comprising a plurality of modules, an inlet, and an outlet, in accordance with some embodiments.

In some embodiments, a fluidic system comprises one or more components in addition to the module(s). As one example, in some embodiments, a fluidic system comprises an inlet. The inlet may feed the first module with fluid that will flow therethrough. As another example, in some embodiments, a fluidic system comprises an outlet. The outlet may allow for removal of fluid after it has flowed through the fluidic system. FIG. 3 shows one non-limiting example of a fluidic system 300 comprising a plurality of modules 304, an inlet 306, and an outlet 308. As shown in FIG. 3, the inlet may be positioned on the bottom and/or on a lower portion of the fluidic system. Similarly, and as also shown in FIG. 3, the outlet may be positioned at the top and/or on an upper portion of the fluidic system. Without wishing to be bound by any particular theory, this arrangement of the inlet and the outlet may facilitate flow having a relatively uniform time-averaged linear flow rate and/or time-averaged flux across the transverse cross-sectional area of the module, especially when the flow comprises the flow of a gas or other buoyant species. However, it is also possible for the inlet and outlet to have other orientations with respect to each other and the fluidic system (e.g., the inlet may be positioned on the top and/or on an upper portion of the fluidic system, the inlet may be positioned in a middle portion of the fluidic system, the outlet may be positioned on the bottom and/or in a lower portion of the fluidic system, the outlet may be positioned in a middle portion of the fluidic system).

Figure 4:
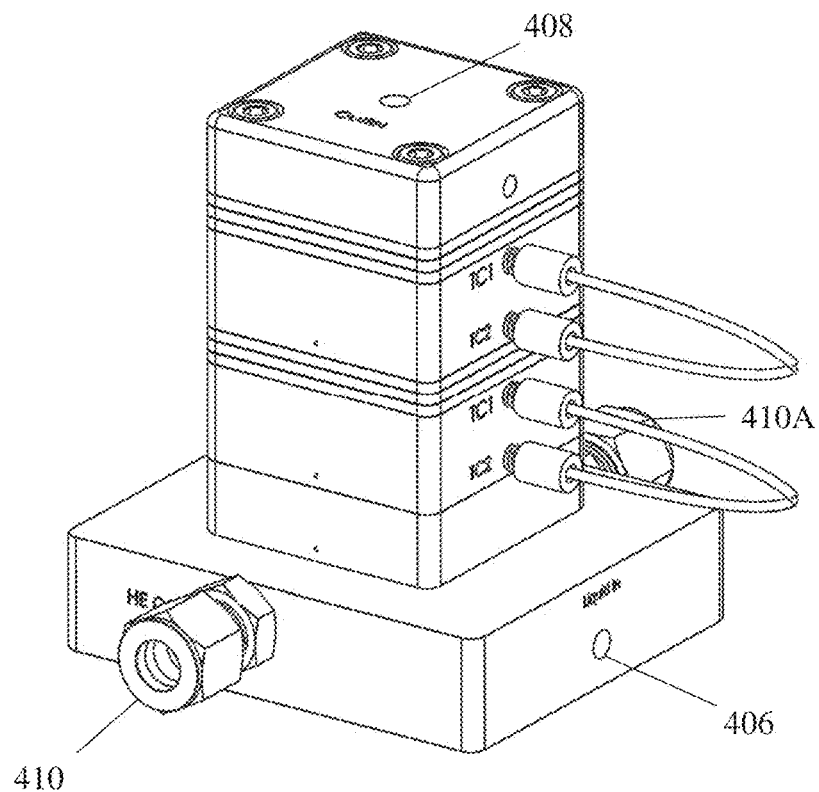
FIGS. 4 and 5 show different views of a fluidic system, in accordance with some embodiments.
Figure 5:
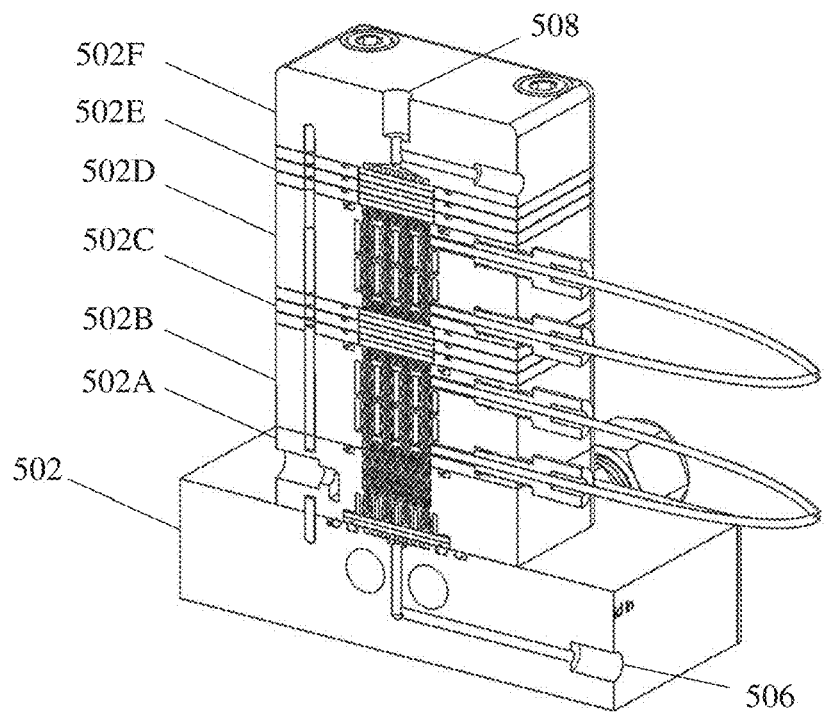

FIGS. 4 and 5 show different views of a further non-limiting example of a fluidic system. FIG. 4 shows an external, perspective view of the fluidic system and FIG. 5 shows a cross-sectional, perspective view of the fluidic system. The fluidic system shown in FIGS. 4 and 5 includes seven modules (shown as reference signs 502-502F in FIG. 5), inlets positioned at the base of the fluidic system (shown as reference signs 406 and 506), and outlets positioned at the top of the fluidic system (shown as reference signs 408 and 508). The base of the fluidic system shown in FIGS. 4 and 5 also includes connections through which fluids that may be employed in heat exchange modules can be supplied and/or transported out of the fluidic system (shown as reference signs 410 and 410A).

In some embodiments, like the embodiment shown in FIGS. 4 and 5, a fluidic system may comprise a plurality of modules that are in fluidic communication with each other and/or are mechanically coupled to each other. In such embodiments, fluid may flow through the fluidic system from one module to another in a relatively facile manner and/or without a substantial change (e.g., without a change by more than 10%, more than 5%, or more than 2%) in the transverse cross-sectional area of the flow. However, it is also possible for fluidic systems to comprise modules having other designs (e.g., that can be removed from fluidic communication with each other when desired, that can be assembled together when desired).

Figure 6A:
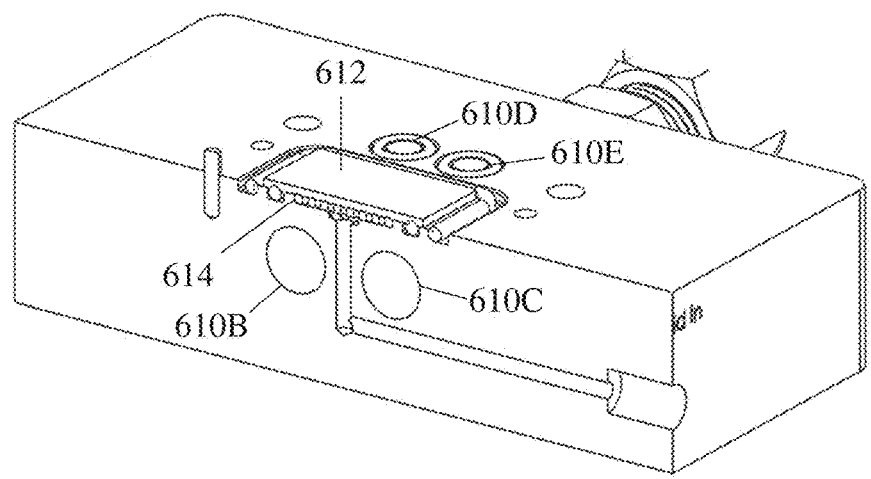
FIG. 6A shows an enlarged view of the inlet and the bottommost module shown in FIGS. 4 and 5, in accordance with some embodiments.

FIG. 6A shows an enlarged view of the inlet and the bottommost module shown in FIGS. 4 and 5. This module, and modules including certain features shown in FIG. 6A (referred to herein as "modules of the type shown in FIG. 6A"), may be especially suitable for use as the bottommost module and/or first module fed by the inlet. Without wishing to be bound by any particular theory, modules having one or more features in common with the module partially shown in FIG. 6A (i.e., modules of the type shown in FIG. 6A) may be particularly suitable for creating flow through the fluidic system that exhibits a relatively uniform time-averaged linear flow rate and/or time-averaged flux across the transverse cross-sectional area of the module. After the relatively uniform time-averaged linear flow rate and/or time-averaged flux is established by such a module, it may be maintained as the fluid continues to flow through the other modules in the fluidic system.

The module shown in FIG. 6A comprises a first layer 612 that is supported by a support 614. As shown in FIG. 6A, the first layer may be disposed on the support. The support may be a relatively open component that includes relatively large pores. For instance, as one example, a module may comprise a support that takes the form of a mesh (e.g., a metal mesh).

As used herein, when a fluidic system and/or module component is referred to as being "disposed on" another such component, it can be directly disposed on the component, or an intervening component also may be present. When a system and/or module component is "directly disposed on" another component, no intervening component is present.

In addition to the inlet and a portion of the bottommost module, FIG. 6A also depicts conduits through which fluids that may be employed in heat exchange modules may flow (shown as reference signs 610B-E).

In some embodiments, a module of the type shown in FIG. 6A may have one or more features that cause the pressure drop from the inlet to the module outlet to be relatively uniform across the various flow paths through the module and/or for the pressure drop from the inlet to the module outlet to be relatively consistent across the module outlet. Such features may take the form of the first layer and support described above (and/or one more of the features described below with respect to FIG. 7 in embodiments in which a module of the type shown in FIG. 6A comprises one or more of the components shown in FIG. 7). It is also possible for such features to take the form of a plurality of channels having a two-dimensional convex hull that increases from the inlet to the module outlet. The two-dimensional convex hull (and the associated channel cross-sections) may be positioned in the plane perpendicular to the direction that fluid flows through the module outlet.

Figure 6B:
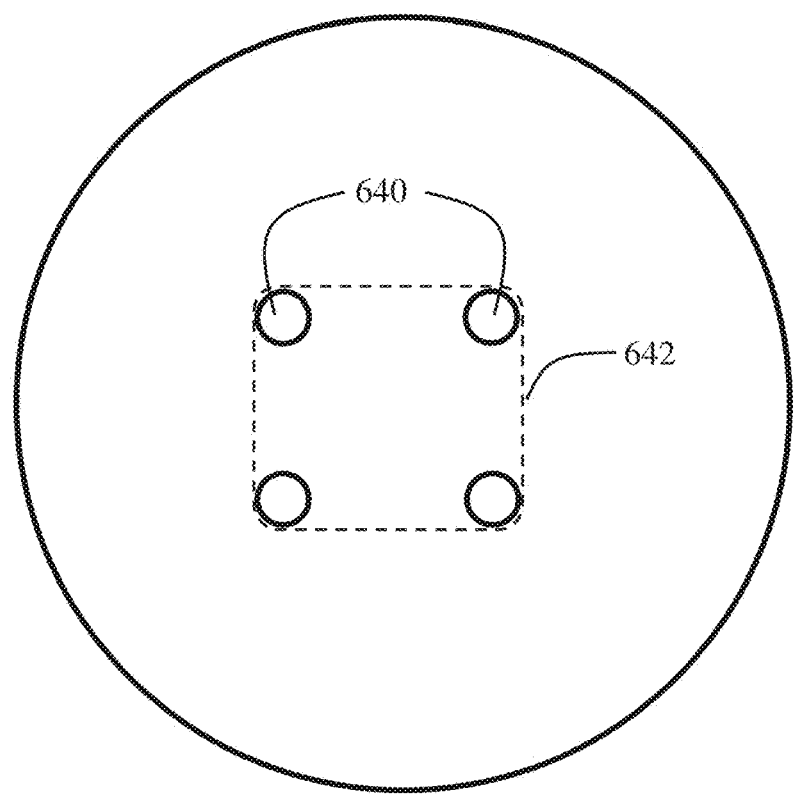
FIGS. 6B-6C show two cross-sections of portions of a module through which four channels extend, in accordance with some embodiments.
Figure 6C:
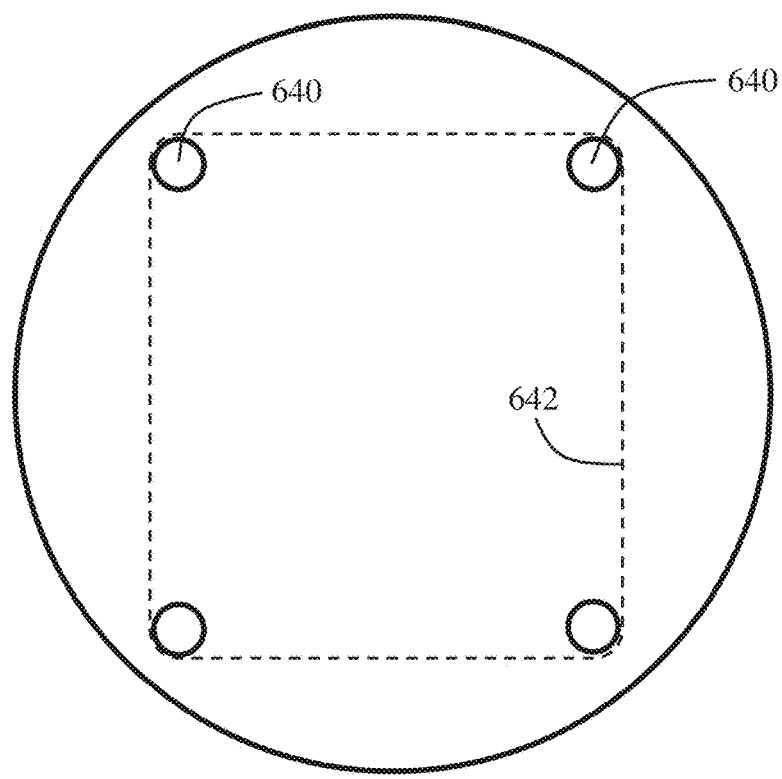

The phrase "two-dimensional convex hull" of a plurality of channel cross-sections within a given module cross-section is given its ordinary meaning in geometry and refers to the smallest two-dimensional convex set that contains each of the plurality of channels. The two-dimensional convex hull is also sometimes referred to in the field of geometry as the two-dimensional convex envelope or the two-dimensional convex closure, and it can be visualized as the shape enclosed by a rubber band stretched around a set of objects when that set of objects is viewed in two-dimensions. This concept is illustrated in FIGS. 6B and 6C, which are two cross-sections of portions of a module through which four channels 640 extend. FIG. 6C shows a cross-section of the portion of the module that is closer to the module exit than the portion of the module shown in FIG. 6B. The two-dimensional convex hulls of channels 640 in these two different cross-sections are shown as dotted line 642. As can be seen from FIGS. 6B and 6C, the two-dimensional convex hulls of these channels increase towards the module exit. In some embodiments, the cross-sectional diameters of the channels remain relatively constant from the inlet to the module exit (e.g., even though the two-dimensional convex hull increases). In some such embodiments, the distances between the channels may increase from the inlet to the module outlet.

Figure 7:
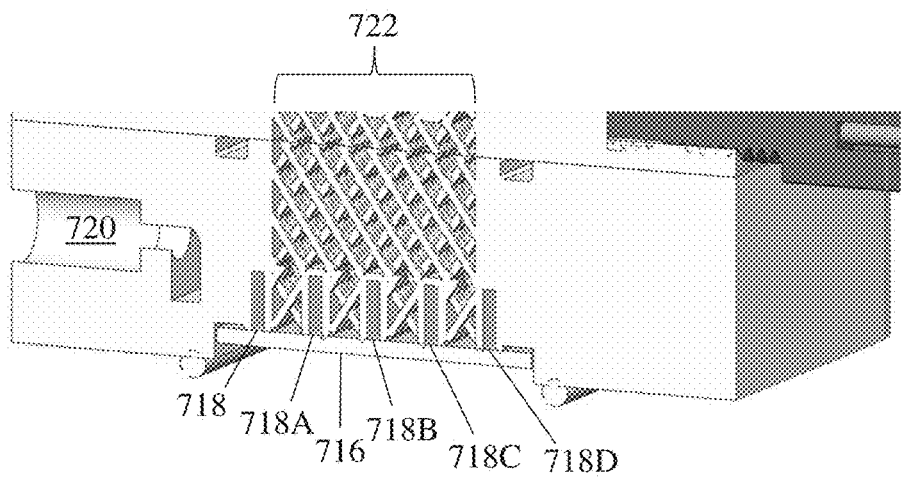
FIG. 7 shows one non-limiting example of a second module that may be disposed on a module of the type shown in FIG. 6A, in accordance with some embodiments.

In some embodiments, a module of the type shown in FIG. 6A further comprises one or more additional components. It is also possible for a module of the type shown in FIG. 6A to be disposed beneath a module that further comprises one or more additional components. FIG. 7 shows one non-limiting example of a second module that may be disposed on a module of the type shown in FIG. 6A. In some embodiments, a single module comprises the components shown in FIG. 6A and some or all of the components shown in FIG. 7. It is also possible for the features shown in FIGS. 6A and 7 to be split among two modules (e.g., as shown in FIGS. 4 and 5). It is also possible for a fluidic system to comprise a module of the type shown in FIG. 7 in a location other than adjacent to a module of the type shown in FIG. 6A.

In some embodiments, a first module comprises the first layer 614 shown in FIG. 6A and a second module comprises one or more components shown in FIG. 7. The portion of the second module shown in FIG. 7 may be disposed on the portion of the first module shown in FIG. 6A. FIG. 7 depicts a module comprising a second layer 716. In some embodiments, a fluidic system has a design in which a second layer like the second layer 716 shown in FIG. 7 is disposed on a first layer like the first layer 614 shown in FIG. 6A. In some such embodiments, both the first and second layers comprise pores, and the pores in the second layer may have a smaller average diameter than the pores in the first layer. Fluid flowing through the module from the first layer to the second layer may, after passing through the first and second layer, exhibit a relatively uniform time-averaged linear flow rate and/or time-averaged flux. Without wishing to be bound by any particular theory, it is believed that this is facilitated by the flow through layers including pores having decreasing average diameters.

As shown in FIG. 7, a module that comprises two layers having different average diameters may further comprise a plurality of fluid inlets (e.g., gas inlets, liquid inlets). For example, with reference to FIG. 7, a module may comprise a plurality of fluid inlets 718-718D. Fluid inlets may be configured to dispense fluid (e.g., a liquid, a gas) to the module. This may be desirable when the module is employed to perform a reaction between a reagent supplied in a fluid supplied at the fluid inlets (e.g., a gas provided at the fluid inlets, a liquid provided at the fluid inlets) and a reagent supplied at the fluidic system inlet (e.g., a liquid provided at the inlet, a gas provided at the inlet).

Fluid inlets may be positioned in a variety of suitable locations. In some embodiments, like the embodiment shown in FIG. 7, fluid inlets are located adjacent to an upper surface of the second layer (e.g., a surface of the second layer opposing the surface of the second layer closest to the first layer). It is also possible for fluid inlets to be located interior to the second layer, between the first and second layers (e.g., at an interface therebetween), interior to the first layer, and/or adjacent to a lower surface of the first layer (e.g., a surface of the first layer opposing the surface of the first layer closest to the second layer). Similarly, fluid inlets may be configured to dispense fluid at a variety of locations. As shown in FIG. 7, fluid inlets may be configured to dispense fluid to an upper surface of the second layer (e.g., a surface of the second layer opposing the surface of the second layer closest to the first layer). It is also possible for fluid inlets to be configured to dispense fluid to the interior of the second layer, between the first and second layers (e.g., at an interface therebetween), to an interior of the first layer, and/or to a lower surface of the first layer (e.g., a surface of the first layer opposing the surface of the first layer closest to the second layer).

Without wishing to be bound by any particular theory, it is believed that fluid that is dispensed at an upper surface of a second layer may facilitate relatively uniform time-averaged linear flow and/or time-averaged flux through the module, across the transverse cross-sectional area of the module, while still allowing for reactions to occur between species provided in a liquid and species provided in the fluid. The fluid flowing through the fluid inlets may flow into the second layer, laterally through the second layer, and then upwards out of the second layer. As it is flowing in this manner, other fluid flowing through the fluidic system, such as fluid (e.g., liquid) supplied by the inlet, may also flow upwards into, through, and out of the second layer. The mixing of the fluid supplied by the inlet and the fluid in the second layer may occur in a manner such that the interface between the fluid supplied by the inlet and the fluid is sufficiently large for reactions between the species disposed in these different fluids to occur. The mixing in the presence of the pores of the second layer may also result in time-averaged linear flow and/or time-averaged flux that is relatively uniform across the transverse cross-section of the module.

In some embodiments, a module and/or modules of the type(s) shown in FIGS. 6A and 7 also include(s) one or more further components. As one example, and as shown in FIG. 7, a module and/or modules of the type(s) shown in FIGS. 6A and 7 may further comprise a feed line that supplies the fluid inlets with fluid (e.g., gas, liquid). This is shown schematically in FIG. 7 by reference number 720.

As another example, and as shown in FIG. 7, a module of the type shown in FIG. 7 may further comprise a volume disposed on the second layer. This volume may make up a portion of an interconnected internal volume positioned in the module. The interconnected internal volume may be a volume interior to the module through which fluid can flow and that is in fluidic communication throughout. In other words, any point in the interconnected internal volume may be a volume inside the module through which fluid can flow and for which all of the points making up the volume are in fluidic communication with each other. As one example, with respect to FIG. 7, the interconnected internal volume in the portion of the module shown therein may comprise the pores in the second layer that are in fluidic communication with the volume disposed above the pores and the volume enclosed by the side walls of the fluid inlet and the side walls through which the fluid cannot flow (shown as a solid enclosing a volume through which static mixing structures are positioned).

In some embodiments, a module of the type shown in FIG. 7 contains a plurality of static mixing structures. This is shown schematically in FIG. 7 by reference number 722. As noted above, the static mixing structures shown in FIG. 7 are positioned in and span the portion of the interconnected internal volume shown in FIG. 7 that is disposed above the second layer. Some modules may comprise static mixing structures that are positioned in this manner, and some modules may comprise static mixing structures that span a smaller portion of the module's interconnected internal volume (e.g., a subset of the volume spanned by the static mixing structures shown in FIG. 7). Without wishing to be bound by any particular theory, the static mixing structures may enhance the rate at which fluid flowing through the module is mixed.

In some embodiments, a fluidic system comprises one or more heat exchange modules. When fluid flows through a heat exchange module (e.g., fluid that flows into a heat exchange module from another module, such as a module of the type shown in FIG. 7), it may undergo a temperature change. This may be accomplished by the presence of one or more elements in the heat exchange module that are configured to heat and/or cool the fluid flowing therethrough. As one example, in some embodiments, a heat exchange module comprises a plurality of heat exchange channels that pass through the module's interconnected internal volume. When fluid flows through the interconnected internal volume, it may pass by (and/or in close proximity) to the heat exchange channels, and be heated or cooled thereby. In some embodiments, a fluid having a certain temperature (e.g., a temperature hotter than the temperature of the fluid flowing through the interconnected internal volume, a temperature colder than the temperature of the fluid flowing through the interconnected internal volume) flows through the heat exchange channels. In such embodiments, the heat exchange channels and/or the temperature of the fluid in the heat exchange channels may remain relatively constant during fluidic system operation. Fluid may be introduced into a heat exchange channel at a desired temperature and then removed from the heat exchange channel after it has been heated or cooled by the fluid flowing through the heat exchange module. In such embodiments, the heat exchange channels may be constantly replenished by fluid having a particular temperature.

Figure 8:
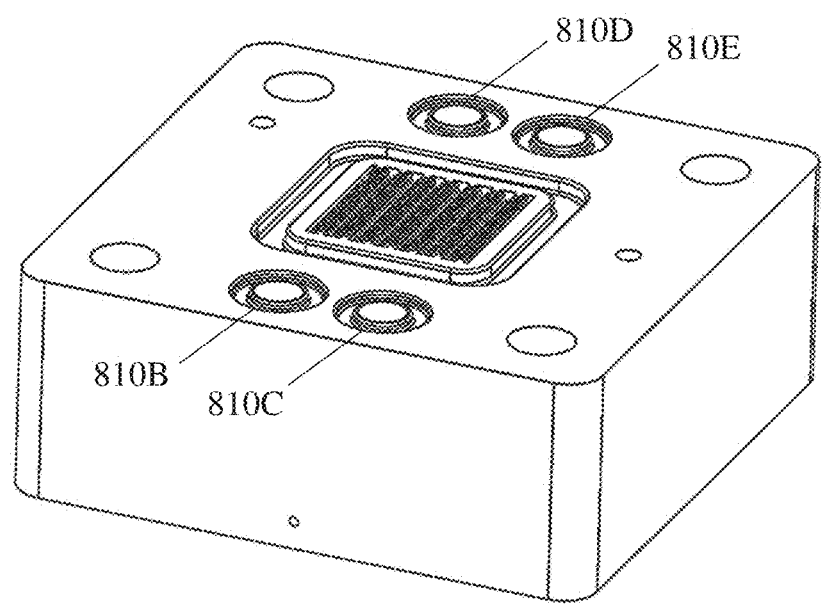
FIGS. 8-9 show two different views of a heat exchange module, in accordance with some embodiments.
Figure 9:
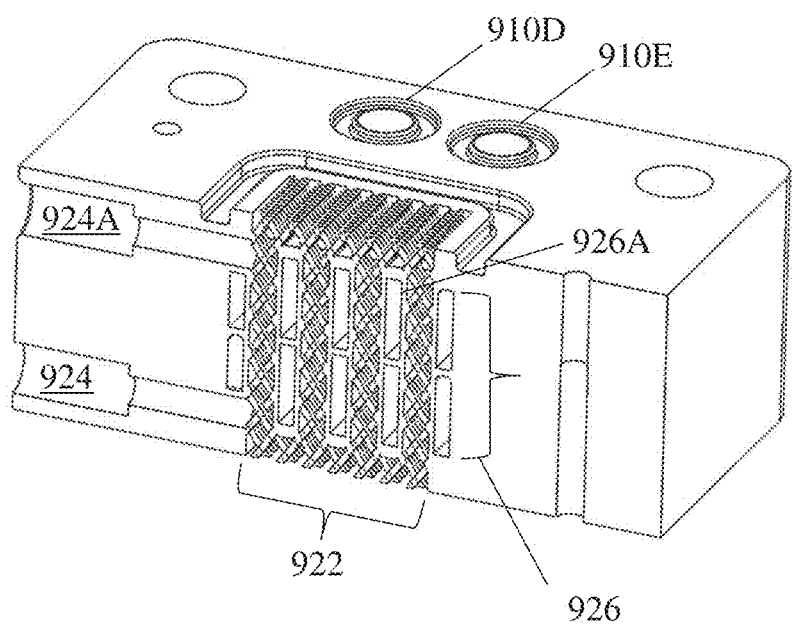
Figure 10:
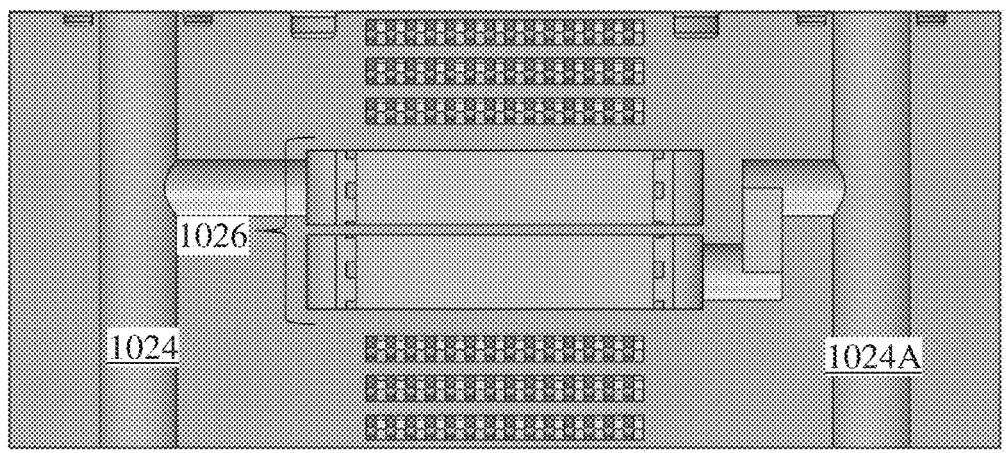
FIG. 10 shows a cross-sectional view of a heat exchange module, in accordance with some embodiments.

In FIG. 5, the modules 502B and 502D are heat exchange modules. When present, heat exchange modules may be positioned in one or both of the locations shown in FIG. 5 and/or in one or more different locations. FIGS. 8 and 9 show two different views of one non-limiting embodiment of a heat exchange module. FIG. 8 shows an external view of the module and FIG. 9 shows a cross-sectional view. FIG. 10 shows a view of a heat exchange module similar to that shown in FIGS. 8 and 9 but having slightly different positioning of the module components. The heat exchange modules shown in FIGS. 8-10 comprise conduits through which fluids that may be employed in heat exchange modules may flow. These include conduits that pass throughout the fluidic system (shown by reference signs 810B-D and 910D-E) and those that fluidically connect such conduits to the heat exchange channels (shown by reference signs 924, 924A, 1024, and 1024A). FIGS. 9 and 10 also depict pluralities of heat exchange channels 926 and 1026, of which exemplary heat exchange channel 926A is also identified. These heat exchange channels pass through the interconnected internal volume (reference sign 922 in FIG. 9) of the heat exchange module.

In some embodiments, like the embodiment shown in FIG. 9, an interconnected internal volume of a heat exchange module comprises a plurality of static mixing structures. In some such embodiments, the static mixing structures are positioned in and span the entirety of the interconnected internal volume (e.g., as in the embodiment shown in FIG. 9). It is also possible for heat exchange modules to comprise static mixing structures that span a smaller portion of the module's interconnected internal volume (e.g., a subset of the volume spanned by the static mixing structures shown in FIG. 9). Without wishing to be bound by any particular theory, in some embodiments, the presence of static mixing elements in a heat exchange module may assist with maintaining a relatively uniform composition of the fluid flowing through the heat exchange module across a transverse cross-section of the heat exchange module and/or promote plug-type flow through the heat exchange module. It is also possible for static mixing elements to assist with heat transfer and/or the formation of a uniform temperature across the transverse cross-section.

Figure 11:
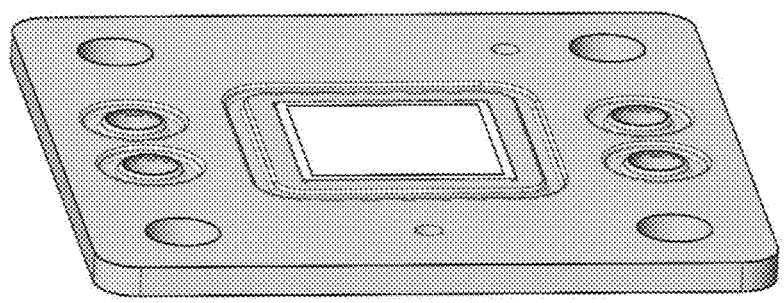
FIGS. 11 and 12 show two different views of an exemplary catalytic module, in accordance with some embodiments.
Figure 12:
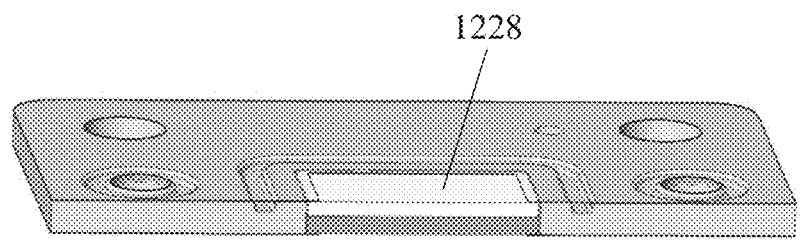

In some embodiments, a fluidic system comprises one or more catalytic modules. In FIG. 5, the modules 502C and 502E are catalytic modules. When present, catalytic modules may be positioned in one or both of the locations shown in FIG. 5 and/or in one or more different locations. The catalytic module(s) may comprise a catalytic material configured to catalyze a reaction between reagents present in an interconnected internal volume. The reagents may be present in a fluid flowing through the interconnected internal volume, and/or in two or more fluids flowing through the interconnected internal volume (e.g., a gas and a liquid). FIGS. 11 and 12 show two different views of an exemplary catalytic module. In the module shown in FIG. 12, the catalytic material is positioned in a layer 1228. Some catalytic modules may include a catalytic material positioned in this manner. It is also possible for catalytic modules to include catalytic material that is arranged in a different matter.

In some embodiments, a fluidic system comprises a measurement module. The measurement module(s) may comprise one or more sensors. For instance, in some embodiments, a measurement module comprises a temperature sensor, a pressure sensor, a spectroscopic probe, and/or a pH sensor. Fluids flowing through a measurement module may flow such that the sensor can sense a property thereof (e.g., by contact with the fluid, by sensing an optical property of the fluid, by sensing a signal emitted from the fluid). In some embodiments, a fluidic system may be configured to adjust one or more properties thereof based on a sensed property. As one example, in some embodiments, a fluidic system may be configured to adjust the temperature of a fluid flowing through a heat exchange channel based on a measurement performed by a temperature sensor. As another example, in some embodiments, a fluidic system may be configured to adjust the rate at which the fluid is supplied in the module of the type shown in FIGS. 6A and 7 and/or FIG. 7 based on a measurement performed by a spectroscopic probe and/or a pH sensor. It should also be noted that some measurement modules may merely record data obtained from the sensor(s) positioned therein (e.g., for record-keeping purposes).

In some embodiments, a module other than a measurement module comprises one or more sensors. For instance, in some embodiments, a module of the type shown in FIG. 6A, a module of the type shown in FIG. 7, a module of the type shown in FIGS. 6A and 7, and/or a heat exchange module comprises one or more sensors. As one specific example, in some embodiments, a heat exchange module comprises a plurality of temperature sensors positioned at different points therein. Such temperature sensors may be helpful for assessing the temperature and temperature uniformity of the fluid flowing through the heat exchange module. If the temperature and/or temperature uniformity of this fluid is other than desired, the temperature and/or flow rate of the fluid flowing through the heat exchange channels may be adjusted.

In some embodiments, a fluidic system comprises a delay module. The delay module(s) may comprise an interior interconnected volume that fluid flowing through the fluidic device can flow through. The presence of a delay module may provide reactions occurring in the fluid time to finish reacting (e.g., after reaching a desired temperature in a prior heat exchange module and/or being catalyzed in a catalytic module) prior to flowing into another module. In some embodiments, a delay module separates modules between which it is positioned and/or provides mechanical protection to one or both such modules.

Some delay modules may comprise an inert, porous material positioned in some or all of their interconnected internal volumes (e.g., an inert material having one or more features of the porous layers described elsewhere herein). Such delay modules may serve merely to separate other modules, provide a lag time between fluid flowing out of one module and into another, and/or provide mechanical support. In some embodiments, a delay module serves to redistribute one or more fluids so that they are relatively uniformly distributed in the transverse cross-sections of the module (e.g., in some embodiments, independently of the state of the fluids) and/or to enhance the dissolution of a gas present in the delay module into a liquid present in the delay module. This may be accomplished by enhancing the solubility of the gas in the liquid and/or affecting the saturation conditions of the gas in the liquid.

In some embodiments, a delay module comprises one or more components that facilitates a reaction (e.g., one or more reagents and/or catalysts) and/or one or more sensors (e.g., to detect reaction progress). Some delay modules may comprise an ion exchange material and/or a support on which a reaction can be performed (e.g., a solid support for peptide synthesis). Some delay modules may comprise an electrode, which may be employed to facilitate an electrochemical reaction and/or to measure an electrochemical property of a fluid flowing through the delay module. Some delay modules may comprise an absorbent material, which may be employed to carry out an absorption process.

The lag time for a delay module may be selected as desired. In some embodiments, the lag time is greater than or equal to 0 minutes, greater than or equal to 0.25 minutes, greater than or equal to 0.5 minutes, greater than or equal to 0.75 minutes, or greater than or equal to 1 minute. In some embodiments, the lag time may be less than or equal to 5 minutes, less than or equal to 4 minutes, less than or equal to 3 minutes, less than or equal to 2 minutes, less than or equal to 1.75 minutes, less than or equal to 1.5 minutes, less than or equal to 1.25 minutes, or less than or equal to 1 minute. Combinations of the above-referenced ranges are also possible (e.g., greater than or equal to 0 minutes and less than or equal to 5 minutes). Other ranges are also possible.

In some embodiments, a fluidic system comprises a fluid sampling module. The fluid sampling module(s) may comprise one or more ports at which one or more samples of fluid flowing through the module may be removed therefrom. Analyses may be performed on such samples after they have been removed from the fluidic system. The results of the analyses may be employed to adjust one or more properties of the fluidic system (e.g., flow rate of one or more fluids therethrough, temperature in one or more modules). In some embodiments, the results of the analyses may be retained for quality-control purposes and/or record-keeping purposes.

In some embodiments, a fluidic system comprises a reagent addition module. The reagent addition module(s) may comprise one or more ports at which one or more reagents may be added to the module. Such modules may be configured to replenish reagents that have reacted in one or more modules through which fluid has previously flowed. It is also possible for a fluidic system to comprise a reagent addition module that is configured to introduce one or more reagents that have not been previously introduced to the fluid flowing therethrough.

Reagents may be introduced into reagent addition modules in a variety of suitable manners. For instance, reagents may be introduced in the form of gases and/or in the form of liquids. In embodiments, a reagent addition module comprises one or more ports that take the form of fluid inlets (e.g., gas inlets, liquid inlets). In such embodiments, the fluid inlets may have the design shown in FIG. 7 or may have a different design.

Figure 13:
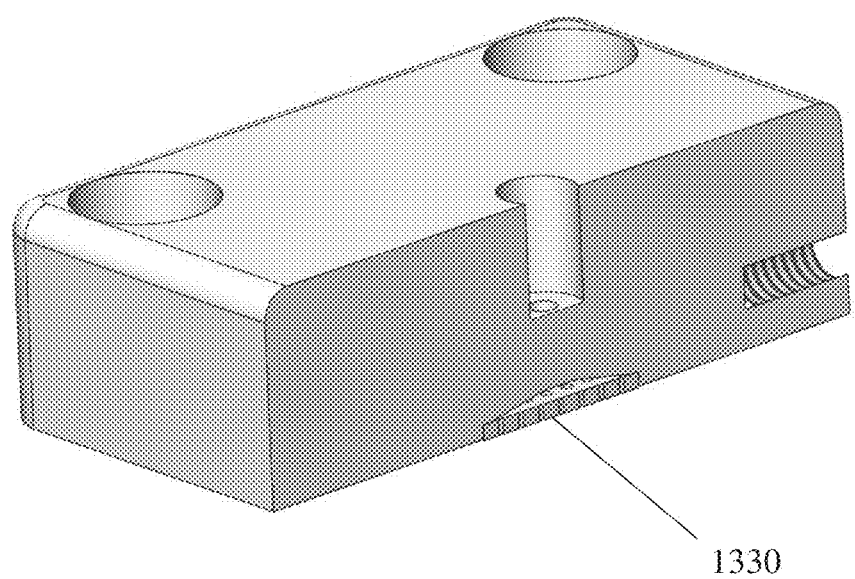
FIGS. 13 and 14 show two different external views of an exemplary terminal module, in accordance with some embodiments.
Figure 14:
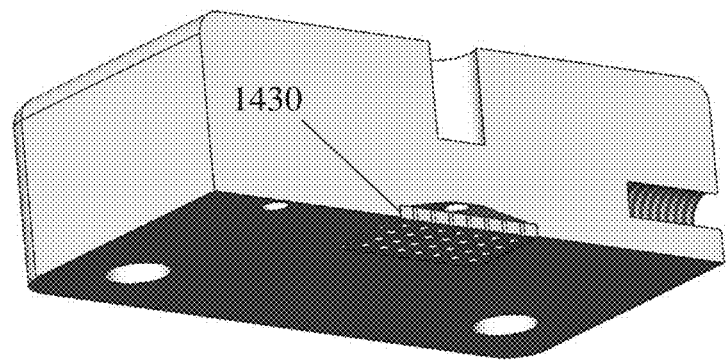

In some embodiments, a fluidic system comprises a terminal module. The fluidic system shown in FIGS. 4 and 5 shows a terminal module identified by reference sign 502F in FIG. 5. The terminal module may be the last module through which fluid flows prior to exiting the fluidic system via the outlet. In some embodiments, the outlet is positioned in the terminal module, and the fluid flowing the fluidic system exits the fluidic system via the terminal module. FIGS. 13 and 14 show two different external views of an exemplary terminal module.

As can be seen from FIGS. 13 and 14, some terminal modules may comprise a mesh (shown as reference signs 1330 and 1430). Fluid flowing through the terminal module may flow through the mesh and then out through the outlet. In some embodiments, a mesh positioned in a terminal module provides mechanical support for a component of another module to which the terminal module is adjacent. As one example, in some embodiments, a mesh provides mechanical support to a component of another module that is relatively non-rigid, such as a support for a catalytic material positioned in a catalytic module to which the terminal module is adjacent.

In some embodiments, a terminal module comprises one or more sensors. Such sensors may be configured to sense one or more properties of a fluid flowing through the fluidic system immediately prior to exit therefrom and/or upon exit therefrom. Non-limiting examples of suitable sensors include temperature sensors and pressure sensors.

As described above, some embodiments relate to modules that are configured such that a fluid flows therethrough with a relatively uniform time-averaged linear flow rate and/or time-averaged flux across the transverse cross-sectional area of the module, and some embodiments relate to methods of flowing fluid through a module with a relatively uniform time-averaged linear flow rate and/or time-averaged flux across the transverse cross-sectional area of the module. This may occur even for modules that have relatively large transverse cross-sectional areas in comparison to the cross-sectional area of the inlet to the fluidic system and/or of an inlet through which the fluid enters the module. For example, in some embodiments, one or more modules in the system may have a transverse cross-sectional area that is at least 1.5, at least 2, at least 5, at least 10, or at least 50 times the transverse cross-sectional area of an inlet through which the fluid enters the fluidic system.

In some embodiments, the module is configured and/or the fluid flows such that, for at least a given percentage of the transverse cross-sections of the module through which the fluid flows, the variation of the linear flow rate of the fluid across the transverse cross-section is within certain bounds when averaged over a certain period time. When two or more fluids flow through a module, each fluid may independently have this property and/or the total fluid flow (i.e., including all fluids flowing through the module) may have this property. Additionally, some or all of the modules described above may have this property for some or all (or all of the fluids together) flowing therethrough.

In some embodiments, a module is configured and/or the fluid flows such that, for at least a given percentage of the transverse cross-sections of the module through which the fluid flows, the variation of the flux of the fluid across the transverse cross-section is within certain bounds when averaged over a certain period time. When two or more fluids flow through a module, each fluid may independently have this property and/or the total fluid flow (i.e., including all fluids flowing through the module) may have this property. Additionally, some or all of the modules described above may have this property for some or all (or all of the fluids together) flowing therethrough.

The transverse cross-sections of a module through which fluid flows refers to the cross-sections of the interconnected internal volume of the module that are perpendicular to the direction of fluid flow out of the module. The transverse cross-sections of the module through which fluid flows should be understood to include this interconnected internal volume but exclude other portions of the module through which fluid flowing therethrough cannot flow (e.g., the solid interiors of solid mixing elements inaccessible to such fluid, heat exchange channels that are fluidically isolated from the interconnected internal volume, etc.). For the avoidance of doubt, properties of fluid flowing through a transverse cross-section refer to the properties that are averaged over the portions of the transverse cross-section through which fluid flows (i.e., the portions of the transverse cross-section that are also part of the interconnected internal volume). When a module is oriented such that fluid flows vertically therethrough, the transverse cross-sections of the modules are the cross-sections of the interconnected internal volume that are perpendicular to the direction of gravity.

Figure 15:
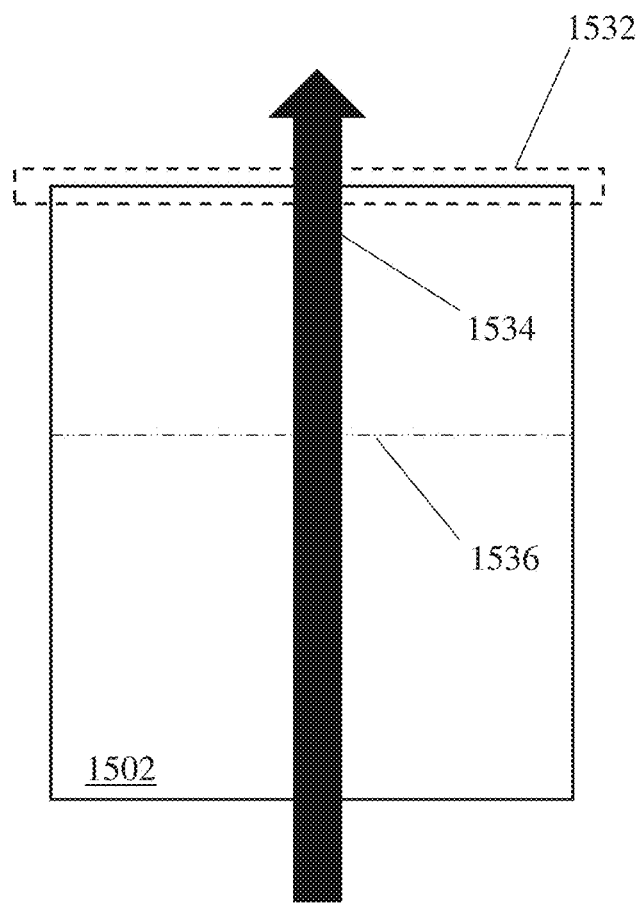
FIG. 15 shows a fluidic module and identifies several features that may be relevant to calculating the uniformity of the time-averaged linear flow rate and/or time-averaged flux of the fluid across the transverse cross-section, in accordance with some embodiments.

FIG. 15 shows a fluidic module and identifies several features that may be relevant to calculating the uniformity of the time-averaged linear flow rate and/or time-averaged flux of the fluid across the transverse cross-section. In FIG. 15, fluid flows out of the fluidic module 1502 through the module outlet 1532 in the direction indicated by the arrow 1534. Accordingly, the transverse cross-sections of the module 1502 are the cross-sections perpendicular to the arrow 1534. In the context of FIG. 15, these would be portions of the plane perpendicular to the arrow 1534 that are included in the interconnected internal volume of the module 1502. The line segment 1536 shows one projection of such a plane perpendicular to the plane of the drawing (i.e., the transverse cross-section would include the line segment 1536 and also project directly outwards from the plane of the drawing). As can be seen from FIG. 15, a module can comprise many transverse cross-sections (e.g., the as many transverse cross-sections as the number of line segments that can pass from one side of the module to another and intersect the arrow 1534). The percentage of transverse cross-sections having a particular property can be calculated by determining whether each transverse cross-section has the relevant property and then determining the relevant percentage.

Figure 16:
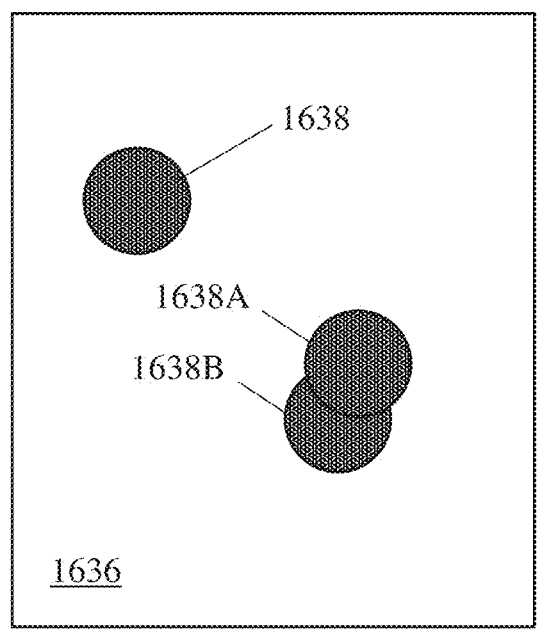
FIG. 16 shows one non-limiting example of a transverse cross-section, in accordance with some embodiments.

FIG. 16 shows one non-limiting example of a transverse cross-section 1636. Fluid flowing through a module in which the transverse cross-section 1636 is positioned may flow through the transverse cross-section 1636 (e.g., out of the plane of the drawing). The flow of the fluid through the transverse cross-section 1636 may vary across the transverse cross-section. The percentage of the points in the transverse cross-section having a particular linear flow rate (e.g., a linear flow rate within a certain range) may be determined by determining the flow rate at each point in the transverse cross-section and then determining the relevant percentage. Similarly, the spatially-averaged linear flow rate across the transverse cross-section may be determined by averaging the linear flow rate at each point in the transverse cross-section. This spatially-averaged linear flow rate may further be averaged over a period of time by computing the average at all the time points in the time period and then determining the average. As noted above, the portions of the transverse cross-section over which these calculations should be made are those through which fluid flows (i.e., those that overlap with the interconnected internal volume).

Also with reference to FIG. 16, the percentage of 1 $mm^2$ circles within the transverse cross-section 1636 having a particular flux (e.g., a flux within a certain range) may be determined by determining the flux at each possible 1 $mm^2$ circle that can be drawn inside the transverse cross-section and then determining the relevant percentage. FIG. 16 schematically shows three such 1 $mm^2$ circles (1638, 1638A, and 1638B). As can be seen from FIG. 16, some 1 $mm^2$ circles that can be drawn overlap with each other (e.g., in the case of the circles 1638A and 1638B) and some 1 $mm^2$ circles that can be drawn do not overlap with each other (e.g., in the case of the circles 1638 and 1638A). The spatially-averaged flux across the transverse cross-section may be determined by averaging the flux at each such 1 $mm^2$ circle. This spatially-averaged flux may further be averaged over a period of time by computing the average at all the time points in the time period and then determining the average.

In some embodiments, the percentage of the transverse cross-sections of the module through which the time-averaged linear flow rate is relatively uniform is relatively high. The percentage of the transverse cross-sections of the module through which the time-averaged linear flow rate is relatively uniform may be greater than or equal to 60%, greater than or equal to 65%, greater than or equal to 70%, greater than or equal to 75%, greater than or equal to 80%, greater than or equal to 82.5%, greater than or equal to 85%, or greater than or equal to 87.5%. The percentage of the transverse cross-sections of the module through which the time-averaged linear flow rate is relatively uniform may be less than or equal to 100%, less than or equal to 97.5%, less than or equal to 95%, or less than or equal to 92.5%. Combinations of the above-referenced ranges are also possible (e.g., greater than or equal to 70% and less than or equal to 100%, or greater than or equal to 80% and less than or equal to 100%). Other ranges are also possible.

In some embodiments, the time-averaged linear flow rate of a fluid across a transverse cross-section is relatively uniform over a high percentage of the area of the transverse cross-section. In some embodiments, greater than or equal to 60%, greater than or equal to 65%, greater than or equal to 70%, greater than or equal to 75%, greater than or equal to 80%, greater than or equal to 82.5%, greater than or equal to 85%, or greater than or equal to 87.5% of the points in the transverse cross-sections through which the flow rate is relatively uniform have a time-averaged linear flow rate within a certain range of the spatially- and time-averaged linear flow rate across the transverse cross-section. In some embodiments, less than or equal to 100%, less than or equal to 97.5%, less than or equal to 95%, or less than or equal to 92.5% of the points in the transverse cross-sections through which the flow rate is relatively uniform have a linear flow rate within a certain range of the spatially- and time-averaged linear flow rate across the transverse cross-section. Combinations of the above-referenced ranges are also possible (e.g., greater than or equal to 60% and less than or equal to 100%, or greater than or equal to 80% and less than or equal to 100%). Other ranges are also possible.

The time-averaged linear flow rate range within which the percentage of points described in the preceding paragraph fall may be selected as desired. In some embodiments, a percentage of points in the linear transverse cross-section through which the fluid flows that is in one or more of the ranges in the preceding paragraphs has a time-averaged linear flow rate that is within 50%, within 45%, within 40%, within 35%, within 30%, within 25%, or within 20% of the spatially- and time-averaged linear flow rate of the fluid across the transverse cross-section.

The period of time over which the averaging is performed may be selected as desired. In some embodiments, the period of time over which the averaging is performed is greater than or equal to 10 seconds, greater than or equal to 15 seconds, greater than or equal to 20 seconds, or greater than or equal to 25 seconds. In some embodiments, the period of time over which the averaging is performed is less than or equal to 60 seconds, less than or equal to 55 seconds, less than or equal to 50 seconds, or less than or equal to 45 seconds. Combinations of the above-referenced ranges are also possible (e.g., greater than or equal to 10 seconds and less than or equal to 60 seconds). Other ranges are also possible. It is also possible for the period of time over which the averaging is performed to be identically equal to one or more of the time periods provided above (e.g., exactly 10 seconds, exactly 60 seconds).

In some embodiments, fluid flows through a module such that, for at least a percentage of the transverse cross-sections of the module through which the fluid flows in one or more of the ranges provided above (e.g., for greater than or equal to 60% and/or less than or equal to 100% of the transverse cross-sections), the linear flow rate of the fluid at a percentage of points within the transverse cross-section in one or more of the ranges provided above (e.g., greater than or equal to 60% of such points and/or less than or equal to 100% of such points), when averaged over a period of time in one or more of the ranges provided above and/or at one or more of the time periods provided above (e.g., over a period of time of 60 seconds, over a period of time of 10 seconds, over a period of time of greater than or equal to 60 seconds and less than or equal to 10 seconds), is within one or more of the ranges provided above of the spatially-averaged linear flow rate of the fluid across the transverse cross-section (e.g., within 50%) when averaged over the same period of time.

In some embodiments, fluid flows through a module such that, for at least one particular transverse cross-section of the module through which the fluid flows in one or more of the ranges provided above (e.g., the transverse cross-section at the module outlet), the linear flow rate of the fluid at a percentage of points within the transverse cross-section in one or more of the ranges provided above (e.g., greater than or equal to 60% of such points and/or less than or equal to 100% of such points), when averaged over a period of time in one or more of the ranges provided above and/or at one or more of the time periods provided above (e.g., over a period of time of 60 seconds, over a period of time of 10 seconds, over a period of time of greater than or equal to 60 seconds and less than or equal to 10 seconds), is within one or more of the ranges provided above of the spatially-averaged linear flow rate of the fluid across the transverse cross-section (e.g., within 50%) when averaged over the same period of time.

In some embodiments, the percentage of the transverse cross-sections of the module through which the time-averaged flux is relatively uniform is relatively high. The percentage of the transverse cross-sections of the module through which the time-averaged flux is relatively uniform may be greater than or equal to 60%, greater than or equal to 65%, greater than or equal to 70%, greater than or equal to 75%, greater than or equal to 80%, greater than or equal to 82.5%, greater than or equal to 85%, or greater than or equal to 87.5%. The percentage of the transverse cross-sections of the module through which the time-averaged flux is relatively uniform may be less than or equal to 100%, less than or equal to 97.5%, less than or equal to 95%, or less than or equal to 92.5%. Combinations of the above-referenced ranges are also possible (e.g., greater than or equal to 60% and less than or equal to 100%, or greater than or equal to 80% and less than or equal to 100%). Other ranges are also possible.

In some embodiments, the time-averaged flux of a fluid across a transverse cross-section is relatively uniform over a high percentage of the area of the transverse cross section. In some embodiments, greater than or equal to 60%, greater than or equal to 65%, greater than or equal to 70%, greater than or equal to 75%, greater than or equal to 80%, greater than or equal to 82.5%, greater than or equal to 85%, or greater than or equal to 87.5% of the 1 mm$^2$ circles in the transverse cross-sections through which the flux is relatively uniform have a time-averaged flux within a certain range of the spatially- and time-averaged flux across the transverse cross-section. In some embodiments, less than or equal to 100%, less than or equal to 97.5%, less than or equal to 95%, or less than or equal to 92.5% of the 1 mm$^2$ circles in the transverse cross-sections through which the flow rate is relatively uniform have a flux within a certain range of the spatially- and time-averaged flux across the transverse cross-section. Combinations of the above-referenced ranges are also possible (e.g., greater than or equal to 60% and less than or equal to 100%, or greater than or equal to 80% and less than or equal to 100%). Other ranges are also possible.

The time-averaged flux range within which the percentage of points described in the preceding paragraph fall may be selected as desired. In some embodiments, a percentage of the 1 mm$^2$ circles in the linear transverse cross-section through which the fluid flows that is in one or more of the ranges in the preceding paragraphs has a time-averaged flux that is within 50%, within 45%, within 40%, within 35%, within 30%, within 25%, or within 20% of the spatially- and time-averaged flux of the fluid across the transverse cross-section.

The period of time over which the averaging is performed may be selected as desired. In some embodiments, the period of time over which the averaging is performed is greater than or equal to 10 seconds, greater than or equal to 15 seconds, greater than or equal to 20 seconds, or greater than or equal to 25 seconds. In some embodiments, the period of time over which the averaging is performed is less than or equal to 60 seconds, less than or equal to 55 seconds, less than or equal to 50 seconds, or less than or equal to 45 seconds. Combinations of the above-referenced ranges are also possible (e.g., greater than or equal to 10 seconds and less than or equal to 60 seconds). Other ranges are also possible. It is also possible for the period of time over which the averaging is performed to be identically equal to one or more of the time periods provided above (e.g., exactly 10 seconds, exactly 60 seconds).

In some embodiments, fluid flows through a module such that, for at least a percentage of the transverse cross-sections of the module through which the fluid flows in one or more of the ranges provided above (e.g., for greater than or equal to 60% and/or less than or equal to 100% of the transverse cross-sections), the flux of the fluid at a percentage of the 1 mm$^2$ circles within the transverse cross-section in one or more of the ranges provided above (e.g., greater than or equal to 60% of such circles and/or less than or equal to 100% of such circles), when averaged over a period of time in one or more of the ranges provided above and/or at one or more of the time periods provided above (e.g., over a period of time of 60 seconds, over a period of time of 10 seconds, over a period of time of greater than or equal to 60 seconds and less than or equal to 10 seconds), is within one or more of the ranges provided above of the spatially-averaged flux of the fluid across the transverse cross-section (e.g., within 50%) when averaged over the same period of time.

In some embodiments, fluid flows through a module such that, for at one particular transverse cross-section of the module through which the fluid flows in one or more of the ranges provided above (e.g., the transverse cross-section at the module outlet), the flux of the fluid at a percentage of the 1 mm$^2$ circles within the transverse cross-section in one or more of the ranges provided above (e.g., greater than or equal to 60% of such circles and/or less than or equal to 100% of such circles), when averaged over a period of time in one or more of the ranges provided above and/or at one or more of the time periods provided above (e.g., over a period of time of 60 seconds, over a period of time of 10 seconds, over a period of time of greater than or equal to 60 seconds and less than or equal to 10 seconds), is within one or more of the ranges provided above of the spatially-averaged flux of the fluid across the transverse cross-section (e.g., within 50%) when averaged over the same period of time.

In some embodiments, a module has an interconnected internal volume that makes up a relatively large percentage thereof. Similarly, some methods comprise flowing a fluid through a module for which an interconnected internal volume that makes up a relatively large percentage thereof. Some or all of the modules described above may have this property. The amount of interconnected internal volume in a module may be parametrized by a relatively high percentage of the transverse cross-sections of the module as a whole being occupied to a relatively high degree by the module's interconnected internal volume.

In some embodiments, the percentage of the transverse cross-sections of the module for which the module's interconnected internal volume makes up a relatively large amount is greater than or equal to 80%, greater than or equal to 82.5%, greater than or equal to 85%, or greater than or equal to 87.5%. The percentage of the transverse cross-sections of the module for which the module's interconnected internal volume makes up a relatively large amount may be less than or equal to 100%, less than or equal to 97.5%, less than or equal to 95%, or less than or equal to 92.5%. Combinations of the above-referenced ranges are also possible (e.g., greater than or equal to 80% and less than or equal to 100%). Other ranges are also possible.

In some embodiments, the interconnected internal volume of a module makes up greater than or equal to 30%, greater than or equal to 35%, greater than or equal to 40%, greater than or equal to 45%, or greater than or equal to 50% of a transverse cross-section of the module for which the module's interconnected internal volume makes up a relatively large amount. In some embodiments, the interconnected internal volume of a module makes up less 100%, less than or equal to 95%, less than or equal to 90%, less than or equal to 85%, or less than or equal to 80% of a transverse cross-section of the module for which the module's interconnected internal volume makes up a relatively large amount. Combinations of the above-referenced ranges are also possible (e.g., greater than or equal to 30% and less than 100%). Other ranges are also possible.

In some embodiments, an interconnected internal volume positioned in a module has a relatively high ratio of the average cross-sectional dimension of the interconnected internal volume perpendicular to the direction in which fluid leaves the module to the length of the interconnected module in the direction in which fluid leaves the module. The average cross-sectional dimension of the interconnected internal volume perpendicular to the direction in which fluid leaves the module may be determined by finding the average length of all of the line segments that pass from one outer edge of the module, through the center of the module, and to an opposing outer edge of the module. Some or all of the modules described above may have a value of this ratio in one or more of the ranges that follow. This ratio may be greater than or equal to 0.2, greater than or equal to 0.3, greater than or equal to 0.4, greater than or equal to 0.5, greater than or equal to 0.75, greater than or equal to 1, greater than or equal to 2, greater than or equal to 5, or greater than or equal to 10. This ratio may be less than or equal to 100, less than or equal to 75, less than or equal to 50, less than or equal to 30, or less than or equal to 25. Combinations of the above-referenced ranges are also possible (e.g., greater than or equal to 0.2 and less than or equal to 100). Other ranges are also possible.

As described above, in some embodiments, a module comprises a plurality of static mixing structures positioned in its interconnected internal volume. Some or all of the modules described above may have this property. Without wishing to be bound by any particular theory, static mixing structures may promote mixing of the fluid and/or fluids that flow in their vicinity. In some embodiments, this is performed while maintaining a laminar flow of the fluid and/or fluids through the interconnected internal volume. It is also possible for a static mixing structure to promote heat exchange and/or plug flow through the module in which the static mixing structure is positioned.

A variety of suitable static mixing structures may be employed. In some embodiments, a static mixing structure that comprises a plurality of inclined plates and/or posts may be positioned in an interconnected internal volume. The inclined plates and/or posts may be positioned at a variety of angles with respect to each other, with respect to the direction of flow through the module, and/or with respect to flow out of the module.

As described above, in some embodiments, a module comprises one or more layers that comprise pores. The layer that comprises pores may comprise, consist essentially of, and/or consist of a porous material. In such instances, the porous material may take the form of a foam or otherwise inherently porous material and/or may comprise a solid material into which pores have been introduced (e.g., via microfabrication). The pores may have a variety or suitable morphologies. For instance, a layer that comprises pores may comprise interconnected pores and/or pores that are fluidically isolated from each other. The pores may be relatively uniform in size (e.g., if introduced to a layer via microfabrication) or may be relatively polydisperse in size (e.g., if the layer comprises a material that inherently comprises polydisperse pores and/or a material manufactured in a manner that generates polydisperse pores). Similarly, the pores may comprise pores that are randomly distributed within the layer that comprises pores and/or may comprise pores that form a pattern. As another example, pore density in a layer that comprises pores may be relatively uniform across the layer or may vary across the layer. It is also possible for a layer that comprises pores to comprise pores of exclusively one type and/or essentially one type (e.g., exclusively monodisperse through-holes introduced thereto via microfabrication) or for a layer that comprises pores to comprise two or more types of pores (e.g., both monodisperse through-holes introduced thereto via microfabrication and polydisperse pores inherently present in a material positioned in the layer).

In some embodiments, a layer that comprises pores comprises pores that have a morphology and are arranged to enhance one or more aspects of flow through the layer that comprises pores and/or through a layer that is disposed on the layer that comprises pores (e.g., another layer comprising pores, a non-porous layer). As one example, a layer that comprises pores may comprise pores that result in the pressure drop across the layer that comprises pores and/or a layer disposed on the layer that comprises pores being of a desirable character. For instance, the pressure drop may cause flow through the layer to have a relatively uniform time-averaged linear flow rate and/or time-averaged flux across its transverse cross-sectional area for a relatively high proportion of the transverse cross-sections and/or the transverse cross-sectional area for a relatively high proportion of the transverse cross-sections of the module in which it is positioned.

It is also possible for the pores in a layer that comprises pores to consist and/or consist essentially of such pores. This type of pressure drop may be facilitated by pores that are relatively monodisperse in size, present in the layer that comprises pores at a relatively uniform density, and/or form a pattern (e.g., monodisperse through-holes introduced thereto via microfabrication that have one or more such features).

It should be noted that flow through a layer that comprises pores will, typically, not include flow through the portions of the layer not occupied by the pores. In such instances, the relatively uniform time-averaged linear flow rate and/or time-averaged flux across the transverse cross-sectional area should be understood to refer to relatively uniform time-averaged linear flow rate and/or time-averaged flux across the portions of the transverse cross-sectional area occupied by the pores.

It should also be noted that layers disposed on layers that comprise pores and receiving fluid from such layers will typically receive fluid only from the pores. This may result in a supply of fluid to a layer disposed on a layer that comprises pores that is non-uniform and/or non-uniform if not spatially averaged. In such instances, the time-averaged linear flow rate and/or time-averaged flux across transverse cross-sections closer to the layer that comprises pores may be less uniform than the time-averaged linear flow rate and/or time-averaged flux across transverse cross-sections further from the layer that comprises pores. For instance, fluid flow into a second layer from a layer that comprises pores and disposed thereon may initially be less uniform but may become more uniform as the fluid flows through the second layer. In such instances, the time-averaged linear flow rate and/or time-averaged flux across the transverse cross-sectional area may be relatively uniform in cross-sections that are distal to the layer that comprises pores even if it is not uniform in cross-sections that are proximal to the layer that comprises pores. In some instances, the area over which a spatial averaging must be performed to result in a computation of a relatively uniform time-averaged linear flow rate and/or time-averaged flux across the transverse cross-sectional area decreases as the distance of the transverse cross-section from the layer that comprises pores increases.

As another example of a pore arrangement that may be beneficial, a layer that comprises pores may comprise pores that result in the development of no more than a modest capillary pressure (e.g., a capillary pressure that is smaller than the pressure drop of the gas across the layer that comprises pores) when both a gas and liquid are flowing together therethrough (e.g., as a biphasic system). It is also possible for the pores in a layer that comprises pores to consist and/or consist essentially of such pores. Without wishing to be bound by any particular theory, it is believed that such biphasic flow may be an undesirable phenomenon that is obtained upon the introduction of further liquids to a module through which a liquid and a gas are already flowing separately. In such instances, it can be desirable to reestablish separate flow of the liquids and the gas. This may be facilitated by the existence of such a capillary pressure because such a capillary pressure may allow for the gas to permeate through all of the pores. This may reduce or eliminate flow non-uniformity due to non-equal filling of the pores by the gas and/or the liquid (e.g., non-equal filling caused by gas/liquid menisci that there is insufficient pressure to displace or break). This type of capillary pressure may be facilitated by pores that are relatively monodisperse in size, present in the layer that comprises pores at a relatively uniform density, and/or form a pattern (e.g., monodisperse through-holes introduced thereto via microfabrication that have one or more such features).

As a third example, a layer that comprises pores may comprise pores whose placement and/or size may be readily controlled. This may, in some instances, allow for fewer pores to be present than would otherwise be required if the pores present had uncontrolled size and/or placement. The size and placement control of pores may be accomplished by microfabrication (e.g., by employing microfabrication to form through-holes).

When present, the pores may have a variety of suitable average diameters. In some embodiments, a module comprises a layer comprising pores that have an average diameter of greater than or equal to 0.1 micron, greater than or equal to 0.2 microns, greater than or equal to 0.5 microns, greater than or equal to 0.75 microns, greater than or equal to 1 micron, greater than or equal to 2 microns, greater than or equal to 5 microns, greater than or equal to 7.5 microns, greater than or equal to 10 microns, greater than or equal to 15 microns, greater than or equal to 20 microns, greater than or equal to 25 microns, greater than or equal to 30 microns, greater than or equal to 35 microns, greater than or equal to 40 microns, or greater than or equal to 45 microns. In some embodiments, a module comprises a layer comprising pores having an average diameter of less than or equal to 100 microns, less than or equal to 90 microns, less than or equal to 80 microns, less than or equal to 70 microns, less than or equal to 50 microns, less than or equal to 45 microns, less than or equal to 40 microns, less than or equal to 35 microns, less than or equal to 30 microns, less than or equal to 25 microns, less than or equal to 20 microns, less than or equal to 15 microns, less than or equal to 10 microns, less than or equal to 7.5 microns, less than or equal to 5 microns, less than or equal to 2 microns, less than or equal to 1 micron, less than or equal to 0.75 microns, less than or equal to 0.5 microns, or less than or equal to 0.2 microns. Combinations of the above-referenced ranges are also possible (e.g., greater than or equal to 0.1 micron and less than or equal to 100 microns, or greater than or equal to 0.1 micron and less than or equal to 50 microns). Other ranges are also possible. The average diameters may be determined by BET porosimetry.

When a module comprises two or more porous layers, each porous layer may independently comprise pores having an average diameter in one or more of the above-described ranges. When such porous layers comprise pores having different average diameters (e.g., where one has a larger average diameter than the other), it should be understood that both average diameters may still fall in one or more of the above-referenced ranges.

In some embodiments, a module comprises two or more porous layers that comprise pores having the same average diameter. In such embodiments, the porous layers may differ in one or more other ways (e.g., thickness).

It is also possible for a module to comprise two porous layers that have different average diameters. In such embodiments, the porous layer having the larger pores may comprise pores having an average pore diameter that is at least 10% greater, at least 20% greater, at least 30% greater, at least 50% greater, at least 75% greater, at least 100% greater, at least 200% greater, or at least 500% greater than the average diameter of the pores in the porous layer comprising the smaller pores. The porous layer having the larger pores may comprise pores having an average diameter that is at most 2000% greater, at most 1500% greater, at most 1000% greater, at most 750% greater, at most 500% greater, at most 200% greater, or at most 10% greater than the average diameter of the pores in the porous layer comprising the smaller pores. Combinations of the above-referenced ranges are also possible (e.g., at least 10% greater and at most 2000% greater). Other ranges are also possible.

When present, the pores may have a variety of suitable polydispersities. In some embodiments, a module comprises a layer comprising pores that have a pore diameter standard deviation of less than or equal to 10 microns, less than or equal to 7.5 microns, less than or equal to 5 microns, less than or equal to 2 microns, or less than or equal to 1 micron. In some embodiments, a module comprises a layer comprising pores that have a pore diameter standard deviation of greater than or equal to 0 microns, greater than or equal to 1 micron, greater than or equal to 2 microns, greater than or equal to 5 microns, or greater than or equal to 7.5 microns. Combinations of the above-referenced ranges are also possible (e.g., greater than or equal to 0 microns and less than or equal to 10 microns). Other ranges are also possible. For instance, in some embodiments, a module comprises a layer comprising highly polydisperse pores, such as pores having a pore diameter standard deviation in excess of 10 microns.

In some embodiments, a module comprises a layer comprising pores that are identical and/or essentially monodisperse (i.e., for which the pore diameter standard deviation is exactly and/or essentially 0 microns, such as within 2% of 0 microns). It is also possible for a module to comprise a layer comprising pores that have a pore diameter distribution such that all of the pores and/or essentially all of the pores have pore diameters that vary from the average pore diameter by no more than an amount referenced above with respect to pore diameter standard deviation.

When a module comprises two or more porous layers, each porous layer may independently comprise pores having a pore diameter standard deviation and/or a pore diameter distribution having one or more of the features described in the previous two paragraphs. When such porous layers comprise pores having different pore diameter standard deviations and/or a pore diameter distributions (e.g., where one has a larger pore diameter standard deviation than the other), it should be understood that both porous layers may still have some or all of the above-referenced features.

In some embodiments, a module comprises two layers that have different pressure drops. As one example, in some embodiments, a module comprises two porous layers that have different pressure drops. The pressure drop of a porous layer may be affected by features of the pores therein. As an example, the pressure drop of a porous layer may be affected by the diameters and/or the lengths of the pores in the porous layer.

As described above, some fluidic systems and modules may be configured for fluid flow therethrough. Similarly, some methods may comprise flowing a fluid through a module and/or a fluidic system. A variety of fluids that may undergo such flow are contemplated. In some embodiments, the fluid comprises a liquid. It is also possible for the fluid to comprise a gas. In some embodiments, the fluid comprises both a liquid and a gas. In some such embodiments, the liquid and the gas may both be flowing through a fluidic system and/or a module together or may be flowing through a fluidic system and/or a module separately (e.g., at different linear flow rates and/or fluxes).

In some embodiments, the fluid(s) flowing through the fluidic systems and modules described herein consist of liquids and/or consist essentially of liquids. For instance, in some embodiments, two liquids (e.g., two immiscible liquids) may flow through the fluidic system and modules described herein and/or may flow together through the fluidic systems and modules described herein.

In some embodiments, two immiscible fluids and/or unmixed fluids flow through a module and/or fluidic system. Such fluids may form a "biphasic system" and the flow of such fluids through the modules and fluidic systems described herein may be referred to as "biphasic flow." In such embodiments, it is possible for reactions to take place at the interface between the immiscible and/or unmixed fluids. It is also possible for one fluid (e.g., that is a pure substance, that is a mixture) to flow through the modules and fluidic systems described herein. Such flow may be referred to as "monophasic flow."

In some embodiments, the flow of fluid through the module(s) and/or systems described herein is not core-sheath flow. Core-sheath flow is an arrangement in which an outer fluid surrounds an inner fluid within a channel such that the inner fluid is transported through the channel without contacting the walls of the channel.

The following examples are intended to illustrate certain embodiments of the present invention, but do not exemplify the full scope of the invention.

Example 1

This Example describes the flow through an exemplary heat exchange module.

Figure 17:
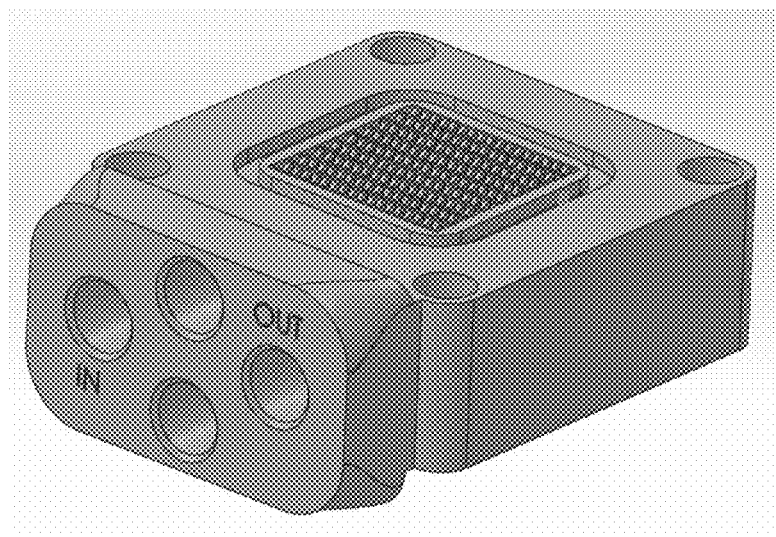
FIGS. 17-19 are machine drawings of different views of a heat exchange module, in accordance with some embodiments.
Figure 18:
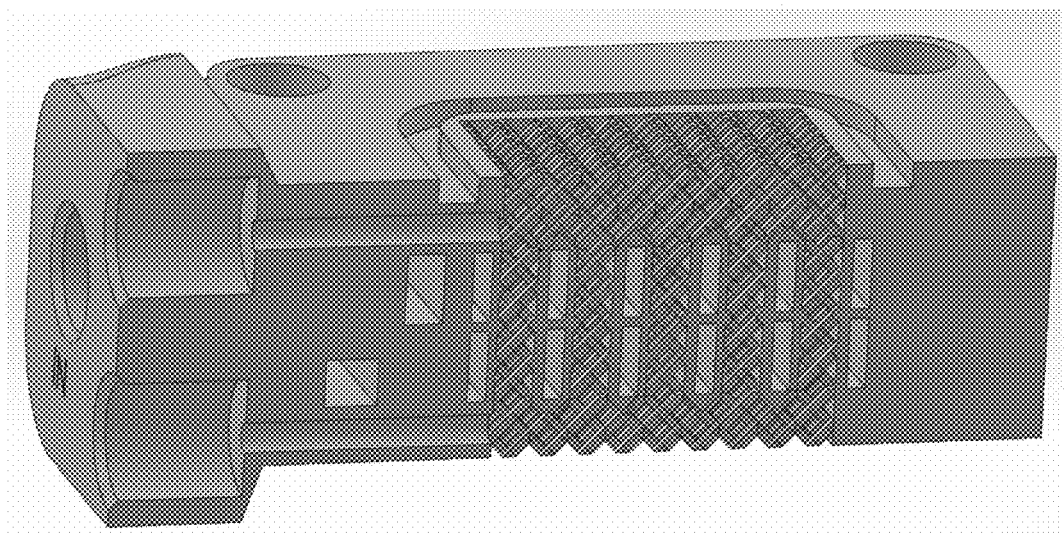
Figure 19:
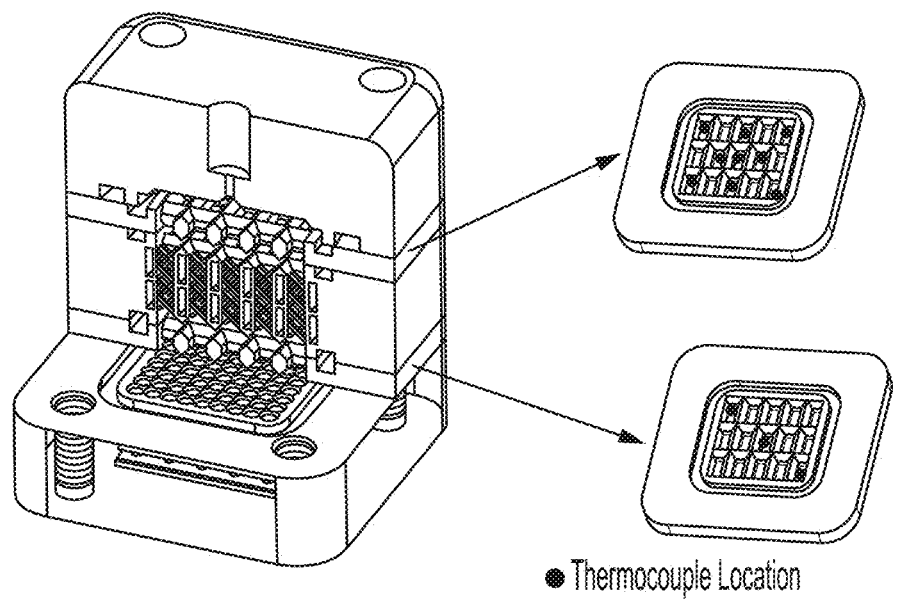
Figure 20:
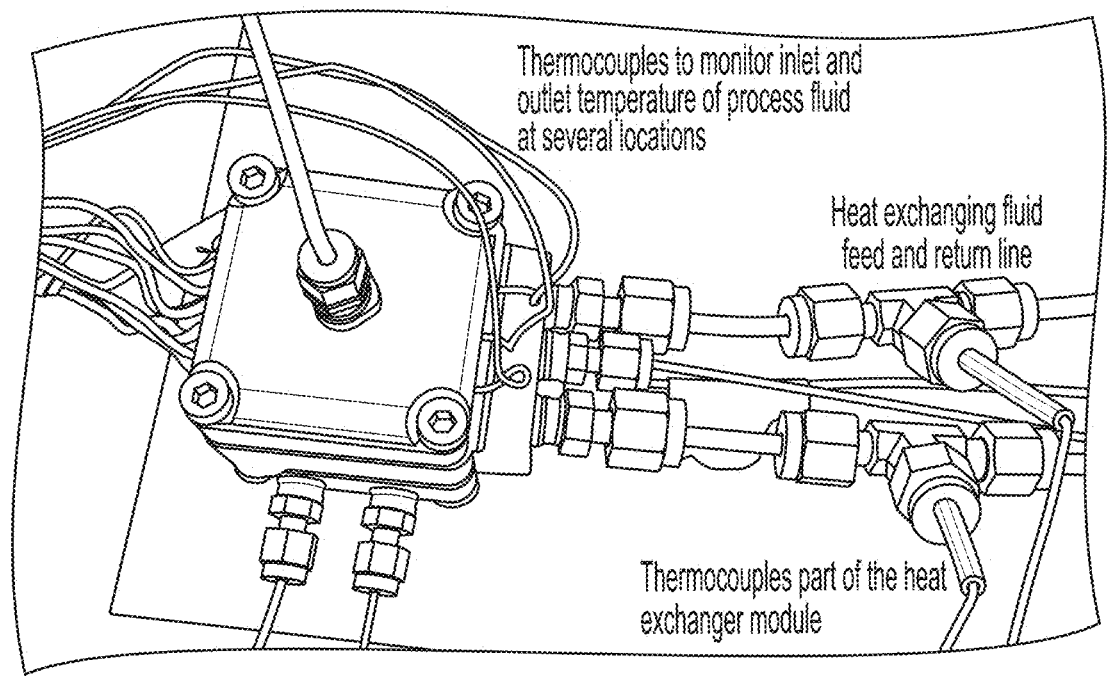
FIG. 20 is an annotated photograph of a heat exchange module, in accordance with some embodiments.

FIGS. 17-19 are machine drawings of different views of the heat exchange module. FIG. 20 is an annotated photograph of the heat exchange module.

Figure 21:
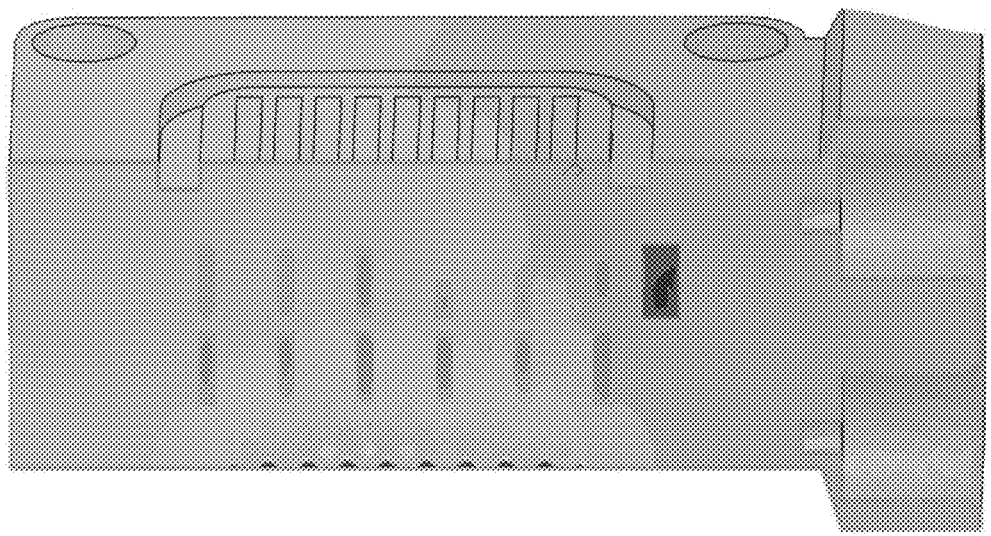
FIGS. 21 and 22 show computed anticipated temperature profiles across a heat exchange module, in accordance with some embodiments.
Figure 21:
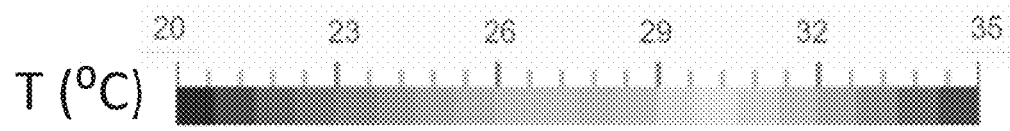
Figure 22:
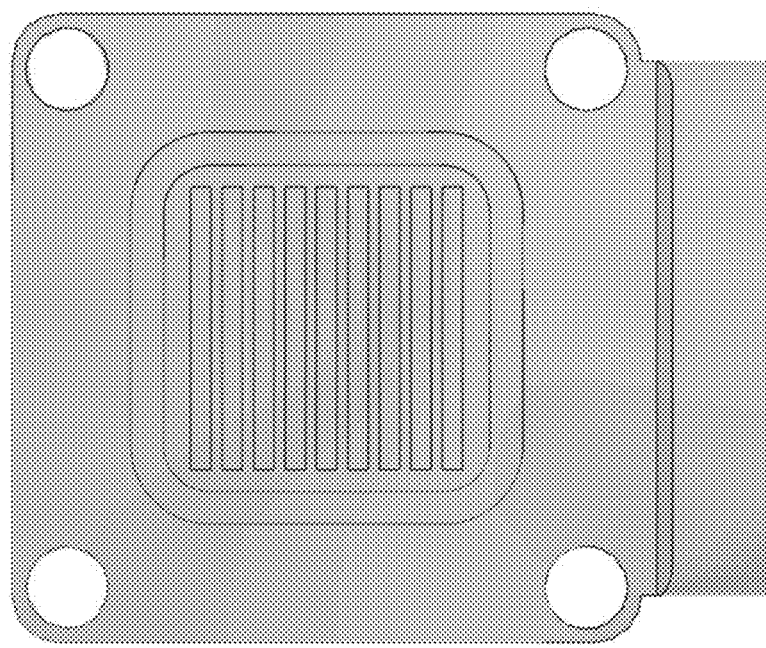
Figure 22:
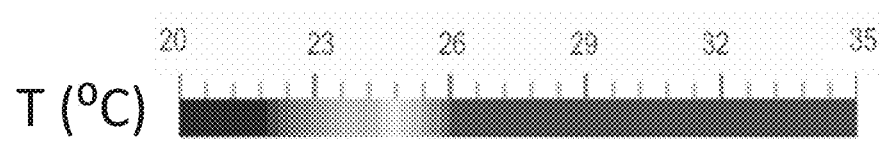

FIGS. 21 and 22 show computed anticipated temperature profiles across the heat exchange module for a fluid flowing therethrough that has a temperature of 35° C. and a flow rate therethrough of 10 mL/min, for which the fluid flowing through the heat exchange channels that has a temperature of 20° C. and a flow rate of 100 mL/min, and in the scenario that the material from which the heat exchange module is formulated is aluminum. As can be seen from these figures, the temperature profile is expected to vary relatively little across the heat exchange module and remain relatively close to 24° C. at the module exit.

Figure 23:
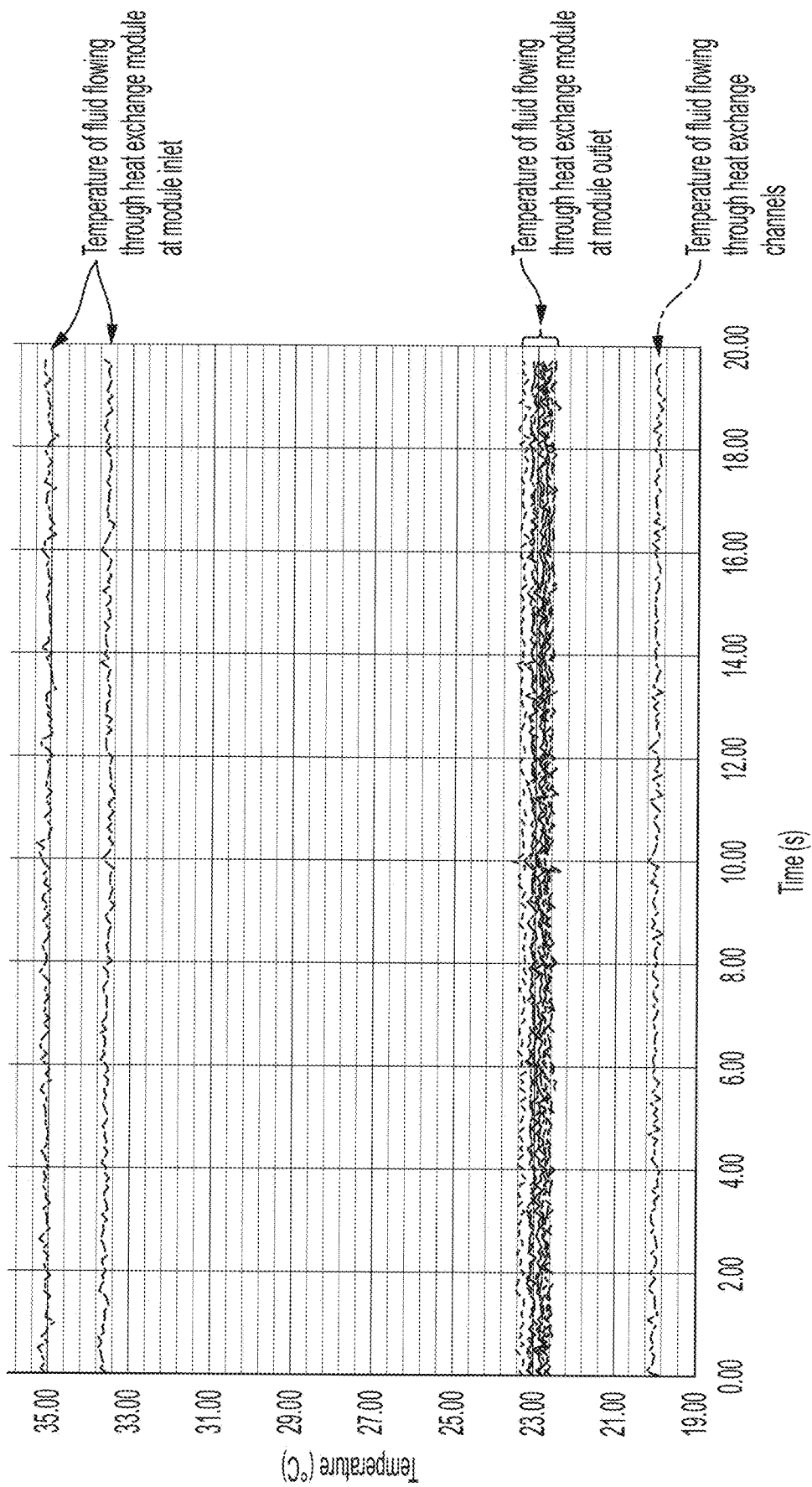
FIG. 23 is a chart showing the temperatures at various points within the heat exchange module, in accordance with some embodiments.

FIG. 23 is a chart showing the temperatures at various points within the heat exchange module. As can be seen from FIG. 23, these temperatures remain relatively constant over time.

Example 2

This Example describes fluid flow through two exemplary fluidic systems having different transverse cross-sectional areas but that are otherwise equivalent.

Each fluidic system included a first module having a structure combining a module of the type shown in FIG. 6A and a module of the type shown in FIG. 7, a first delay module disposed on the first module, a catalytic module disposed on the first delay module, a second delay module disposed on the catalytic module, and an outlet disposed on the second delay module. The larger fluidic system had a transverse cross-sectional area that was ten times the transverse cross-sectional area of the smaller fluidic system and the weight of the catalytic material present in the catalytic module in the larger fluidic system was ten times the weight of the catalytic material present in the catalytic module in the smaller fluidic system.

The fluidic systems were operated such that the flow time-averaged linear flow rate through both fluidic systems was the same.

Figure 24:
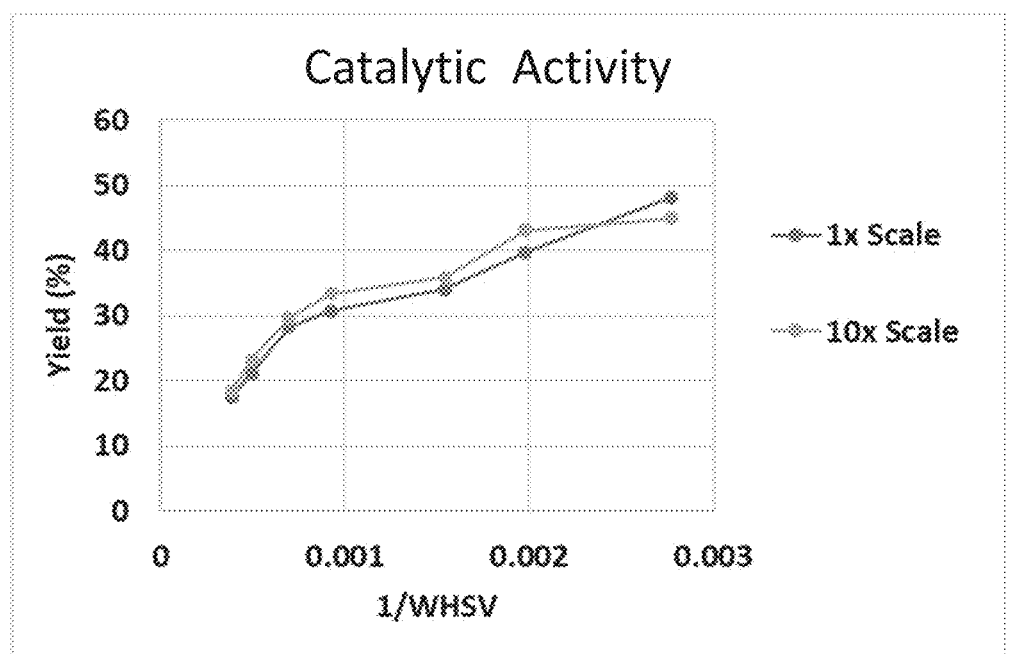
FIG. 24 is a chart showing the yield of a reaction catalyzed by catalytic material present in a catalytic module as a function of 1/WHSV for two fluidic systems.

FIG. 24 shows the yield of the reaction catalyzed by the catalytic material as a function of 1/WHSV (1/weight hourly space velocity) for flow through both fluidic systems. As can be seen from FIG. 24, flow through the larger fluidic system resulted in yields that were substantially the same as obtained during flow through the smaller fluidic system at each value of 1/WHSV. This indicates that fluidic system performance exhibited substantially no dependence on transverse cross-sectional area.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "wt %" is an abbreviation of weight percentage. As used herein, "at %" is an abbreviation of atomic percentage.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less)

acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fluidic system, comprising:
    a first layer;
    a second layer disposed on the first layer; and
    a plurality of fluid inlets that are configured to dispense fluid to the first layer, the second layer, at least one surface of the first layer, and/or at least one surface of the second layer, wherein:
        the first layer comprises pores having a first average diameter,
        the second layer comprises pores having a second average diameter,
        the second average diameter is less than the first average diameter, and
        the fluid inlets are located:
            between the first layer and the second layer, and/or
            interior to the first layer, and/or
            interior to the second layer, and/or
            at a surface of the first layer that is opposite to the surface from which the first layer receives fluid flowing through the fluidic system, and/or
            at a surface of the second layer that is opposite to the surface from which the second layer receives fluid flowing through the fluidic system.

2. A method, comprising:
    flowing a fluid through a fluidic system, wherein:
        the fluidic system comprises a first layer,
        the fluidic system comprises a second layer disposed on the first layer,
        the fluidic system comprises a plurality of fluid inlets that are configured to dispense fluid to the first layer, the second layer, at least one surface of the first layer, and/or at least one surface of the second layer,
        the first layer comprises pores having a first average diameter,
        the second layer comprises pores having a second average diameter,
        the second average diameter is less than the first average diameter, and
        the fluid inlets are located:
            between the first layer and the second layer, and/or
            interior to the first layer, and/or
            interior to the second layer, and/or
            at a surface of the first layer that is opposite to the surface from which the first layer receives fluid flowing through the fluidic system, and/or
            at a surface of the second layer that is opposite to the surface from which the second layer receives fluid flowing through the fluidic system.

3. A fluidic system as in claim 1, wherein the first and second layers are positioned in the same module.

4. A fluidic system as in claim 1, wherein the first and second layers are positioned in different modules.

5. A fluidic system as in claim 1, wherein the fluid comprises a liquid.

6. A fluidic system as in claim 1, wherein the fluid comprises a gas.

7. A fluidic system as in claim 1, wherein the fluid comprises two immiscible fluids.

8. A fluidic system as in claim 1, wherein the fluid inlets are gas inlets.

9. A fluidic system as in claim 1, wherein the fluid inlets are liquid inlets.

10. A fluidic system as in claim 3, wherein the fluidic system further comprises a plurality of fluidic modules, and wherein the plurality of fluidic modules comprises the fluidic module in which the first and second layers are positioned.

11. A fluidic system as in claim 1, wherein the fluidic system comprises a plurality of fluidic modules, and wherein the plurality of fluidic modules further comprises a heat exchange module.

12. A fluidic system as in claim 11, wherein the heat exchange module comprises a plurality of heat exchange channels that pass through an interconnected internal volume.

13. A fluidic system as in claim 1, wherein the fluidic system comprises a plurality of fluidic modules, and wherein the plurality of fluidic modules further comprises a catalytic module.

14. A fluidic system as in claim 13, wherein the catalytic module comprises a catalytic material configured to catalyze a reaction between reagents present in an interconnected internal volume.

15. A fluidic system as in claim 1, wherein the fluidic system comprises a plurality of fluidic modules, and wherein the plurality of fluidic modules further comprises a measurement module.

16. A fluidic system as in claim 15, wherein the measurement module comprises one or more sensors.

17. A fluidic system as in claim 16, wherein the one or more sensors comprise a temperature sensor, a pressure sensor, a spectroscopic probe, and/or a pH sensor.

18. A fluidic system as in claim 1, wherein the fluidic system comprises a plurality of fluidic modules, and wherein the plurality of fluidic modules further comprises a delay module.

19. A fluidic system as in claim 1, wherein the fluidic system comprises a plurality of fluidic modules, and wherein the plurality of fluidic modules further comprises a fluid sampling module.

20. A fluidic system as in claim 1, wherein the fluidic system comprises a plurality of fluidic modules, and wherein the plurality of fluidic modules further comprises a reagent addition module.

21. A fluidic system as in claim 1, wherein the fluidic system comprises a plurality of fluidic modules, and wherein the plurality of fluidic modules comprises a terminal module.

22. A fluidic system as in claim 21, wherein the terminal module comprises one or more sensors.

23. A fluidic system as in claim 22, wherein the one or more sensors comprise a temperature sensor and/or a pressure sensor.

24. A fluidic system as in claim 21, wherein fluid flowing through the fluidic system exits the fluidic system via the terminal module.

25. A fluidic system as in claim 1, wherein the first layer comprising pores and/or the second layer comprising pores comprises pores that are through-holes.

26. A fluidic system as in claim 25, wherein the through-holes are fluidically isolated from each other.

27. A fluidic system as in claim 25, wherein the through-holes are microfabricated through-holes.

28. A fluidic system as in claim 1, wherein the fluidic system comprises an additional inlet that is located upstream from the fluid inlets.

29. A fluidic system as in claim 28, wherein the additional inlet is configured to supply an additional fluid to the fluidic system, and wherein the additional inlet and the fluid inlets are positioned such that the fluid supplied by the additional inlet and the fluid dispensed by the fluidic inlets mix in the second layer.

* * * * *